United States Patent
Kishine et al.

(10) Patent No.: US 12,425,705 B2
(45) Date of Patent: Sep. 23, 2025

(54) IMAGING METHOD AND PROGRAM

(71) Applicant: FUJIFILM Corporation, Tokyo (JP)

(72) Inventors: Yasunobu Kishine, Saitama (JP);
Kazuyoshi Okada, Saitama (JP);
Atsushi Kawanago, Saitama (JP); Yuya Hirakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 116 days.

(21) Appl. No.: 18/399,753

(22) Filed: Dec. 29, 2023

(65) Prior Publication Data

US 2024/0129603 A1 Apr. 18, 2024

Related U.S. Application Data

(63) Continuation of application No. PCT/JP2022/023585, filed on Jun. 13, 2022.

(30) Foreign Application Priority Data

Jul. 30, 2021 (JP) .................. 2021-125278

(51) Int. Cl.
*H04N 23/10* (2023.01)
*H04N 23/71* (2023.01)
(Continued)

(52) U.S. Cl.
CPC ............ *H04N 23/10* (2023.01); *H04N 23/71* (2023.01); *H04N 23/72* (2023.01); *H04N 23/74* (2023.01); *H04N 23/75* (2023.01); *H04N 23/76* (2023.01)

(58) Field of Classification Search
CPC ........ H04N 23/10; H04N 23/71; H04N 23/72; H04N 23/74; H04N 23/75; H04N 23/76;
(Continued)

(56) References Cited

U.S. PATENT DOCUMENTS

2003/0059103 A1 3/2003 Shiomi et al.
2008/0002185 A1 1/2008 Gitelson et al.
(Continued)

FOREIGN PATENT DOCUMENTS

CN 207114406 3/2018
JP 2003130811 5/2003
(Continued)

OTHER PUBLICATIONS

"International Search Report (Form PCT/ISA/210) of PCT/JP2022/023585", mailed on Aug. 23, 2022, with English translation thereof, pp. 1-7.

(Continued)

*Primary Examiner* — Timothy J Henn
(74) *Attorney, Agent, or Firm* — JCIPRNET

(57) ABSTRACT

An imaging method of imaging a subject through a multi-spectral camera including a processor, includes: causing the processor to perform: a data acquisition step of acquiring first spectral data of a first subject, second spectral data of a second subject, and third spectral data of a third subject; a wavelength selection step of selecting a plurality of wavelengths from a wavelength region of the acquired first to third spectral data, the wavelength selection step being for determining, as a computational amount, a difference or a ratio between feature amounts of two pieces of spectral data, from among the first spectral data, the second spectral data, and the third spectral data, and obtaining computational amounts to select the plurality of wavelengths; and an imaging step of imaging a subject including at least one of the first subject, the second subject, or the third subject at the plurality of wavelengths.

17 Claims, 17 Drawing Sheets

(51) Int. Cl.
     *H04N 23/72*     (2023.01)
     *H04N 23/74*     (2023.01)
     *H04N 23/75*     (2023.01)
     *H04N 23/76*     (2023.01)

(58) Field of Classification Search
     CPC .... H04N 23/00; G01J 3/02; G01J 3/51; G01J 4/00
     See application file for complete search history.

(56) References Cited

U.S. PATENT DOCUMENTS

| | | | |
|---|---|---|---|
| 2014/0099074 A1 | 4/2014 | Kano | |
| 2023/0325999 A1* | 10/2023 | Dong | H04N 23/743 348/222.1 |
| 2024/0233187 A1* | 7/2024 | Spiker | H04N 23/10 |

FOREIGN PATENT DOCUMENTS

| | | |
|---|---|---|
| JP | 2006030014 | 2/2006 |
| JP | 2014075699 | 4/2014 |
| JP | 2017053699 | 3/2017 |
| JP | 2017064405 | 4/2017 |
| JP | 2018189565 | 11/2018 |
| JP | 2020165666 | 10/2020 |

OTHER PUBLICATIONS

"International Preliminary Report On Patentability (Form PCT/IPEA/409) of PCT/JP2022/023585", mailed on Jan. 30, 2024, with English translation thereof, pp. 1-8.

\* cited by examiner

IMAGING METHOD AND PROGRAM

CROSS-REFERENCE TO RELATED APPLICATIONS

The present application is a Continuation of PCT International Application No. PCT/JP2022/023585 filed on Jun. 13, 2022 claiming priority under 35 U.S.C § 119(a) to Japanese Patent Application No. 2021-125278 filed on Jul. 30, 2021. Each of the above applications is hereby expressly incorporated by reference, in its entirety, into the present application.

BACKGROUND OF THE INVENTION

1. Field of the Invention

The present invention relates to an imaging method and a program, and more particularly, to an imaging method and a program for a multispectral camera.

2. Description of the Related Art

Conventionally, images at different wavelengths are acquired by using a multispectral camera, and the images have been applied to various applications.

For example, JP2006-30014A describes a technology for estimating a color of a subject by using a camera's spectral sensitivity characteristic measured in advance.

SUMMARY OF THE INVENTION

One embodiment according to the technology of the present disclosure provides an imaging method and a program capable of obtaining a wavelength image in which high wavelength reproducibility is maintained.

According to an aspect of the present invention, there is provided an imaging method of imaging a subject through a multispectral camera including a processor, the imaging method comprising: causing the processor to perform: a data acquisition step of acquiring first spectral data of a first subject, second spectral data of a second subject, and third spectral data of a third subject; a wavelength selection step of selecting a plurality of wavelengths from a wavelength region of the acquired first to third spectral data, the wavelength selection step being for using, as a factor, a difference or a ratio between feature amounts of two pieces of spectral data, among the first spectral data, the second spectral data, and the third spectral data, to select the plurality of wavelengths based on at least two or more factors; and an imaging step of imaging a subject including at least one of the first subject, the second subject, or the third subject at the plurality of wavelengths.

Preferably, the wavelength region of the first to third spectral data is a wavelength region where at least a wavelength region of the first spectral data and a wavelength region of the second spectral data overlap each other.

Preferably, the factor includes a first factor that is a difference or a ratio between feature amounts of the first spectral data and of the third spectral data, and a second factor that is a difference or a ratio between feature amounts of the second spectral data and of the third spectral data, and the plurality of wavelengths are selected based on the first factor and the second factor.

Preferably, one of the plurality of wavelengths is a wavelength at which at least one of the first factor or the second factor is minimized.

Preferably, a step of using the plurality of wavelengths selected in the wavelength selection step to measure intensity ratios of luminance of the plurality of wavelengths within a plurality of regions of image data of the third subject; and a correction step of correcting at least the image data of the third subject based on the intensity ratios are further provided.

Preferably, the correction step includes a first correction step of correcting the intensity ratios of the plurality of regions based on a first intensity ratio that is one of the measured intensity ratios.

Preferably, the correction step includes a second correction step of performing a correction to reduce a difference in the measured intensity ratios.

Preferably, the correction step includes a first correction step of correcting the intensity ratios of the plurality of regions based on a first intensity ratio that is one of the measured intensity ratios, and a second correction step of performing a correction to reduce a difference in the measured intensity ratios.

Preferably, the third subject has constant intensity ratios of luminance of the plurality of wavelengths, which are selected in the wavelength selection step, in a plurality of regions.

Preferably, a first wavelength and a second wavelength are selected in the wavelength selection step, reflectivity $\alpha$ of the first subject and reflectivity $\beta$ of the third subject at the first wavelength and the second wavelength satisfy a relationship of Expression (1), reflectivity $\gamma$ of the second subject and the reflectivity $\beta$ of the third subject at the first wavelength and the second wavelength satisfy a relationship of Expression (2), and ($\beta-\alpha$) and ($\beta-\gamma$) at the second wavelength are smaller than ($\beta-\alpha$) and ($\beta-\gamma$) at the first wavelength, Expressions (1) and (2) being represented by:

$$|\beta-\alpha|/(\beta+\alpha) \leq 0.15 \quad (1); \text{ and}$$

$$|\beta-\gamma|/(\beta+\gamma) \leq 0.15 \quad (2).$$

Preferably, a first wavelength and a second wavelength are selected in the wavelength selection step, reflectivity $\alpha$ of the first subject and reflectivity $\beta$ of the third subject at the first wavelength and the second wavelength satisfy a relationship of Expression (3), reflectivity $\gamma$ of the second subject and the reflectivity $\beta$ of the third subject at the first wavelength and the second wavelength satisfy a relationship of Expression (4), and ($\beta-\alpha$) and ($\beta-\gamma$) at the second wavelength are smaller than ($\beta-\alpha$) and ($\beta-\gamma$) at the first wavelength, Expressions (3) and (4) being represented by:

$$|\beta-\alpha|/(\beta+\alpha) \leq 0.05 \quad (3); \text{ and}$$

$$|\beta-\gamma|/(\beta+\gamma) \leq 0.05 \quad (4).$$

Preferably, a first wavelength, a second wavelength, and a third wavelength are selected in the wavelength selection step, reflectivity $\alpha$ of the first subject and reflectivity $\beta$ of the third subject at the first wavelength, the second wavelength, and the third wavelength satisfy a relationship of Expression (5), reflectivity $\gamma$ of the second subject and the reflectivity $\beta$ of the third subject at the first wavelength, the second wavelength, and the third wavelength satisfy a relationship of Expression (6), and ($\beta-\alpha$) and ($\beta-\gamma$) at the second wavelength are smaller than ($\beta-\alpha$) and ($\beta-\gamma$) at the first wavelength and the third wavelength, Expressions (5) and (6) being represented by:

$$|\beta-\alpha|/(\beta+\alpha) \leq 0.15 \quad (5); \text{ and}$$

$$|\beta-\gamma|/(\beta+\gamma) \leq 0.15 \quad (6).$$

Preferably, a first wavelength, a second wavelength, and a third wavelength are selected in the wavelength selection step, reflectivity α of the first subject and reflectivity β of the third subject at the first wavelength, the second wavelength, and the third wavelength satisfy a relationship of Expression (7), reflectivity γ of the second subject and the reflectivity β of the third subject at the first wavelength, the second wavelength, and the third wavelength satisfy a relationship of Expression (8), and (β−α) and (β−γ) at the second wavelength are smaller than (β−α) and (β−γ) at the first wavelength and the third wavelength, Expressions (7) and (8) being represented by:

$$|β−α|/(β+α) \leq 0.05 \qquad (7); \text{ and}$$

$$|β−γ|/(β+γ) \leq 0.05 \qquad (8).$$

Preferably, the multispectral camera includes a memory that stores a plurality of substitutional subjects substitutable for the third subject and fourth spectral data of each of the plurality of substitutional subjects, and the processor performs a notification step of issuing a notification of one substitutional subject among the plurality of substitutional subjects, as a third subject to be recommended, based on the first spectral data, the second spectral data, and the fourth spectral data.

Preferably, the processor performs a sensitivity correction step of correcting sensitivity of an imaging element of the multispectral camera based on the correction step.

Preferably, a third subject variable display step of variably displaying the third subject is further performed.

Preferably, an irradiation step for shadowless illumination is further performed.

According to another aspect of the present invention, there is provided a program for executing an imaging method of imaging a subject through a multispectral camera including a processor, the program causing the processor to perform: a data acquisition step of acquiring first spectral data of a first subject, second spectral data of a second subject, and third spectral data of a third subject; a wavelength selection step of selecting a plurality of wavelengths from a wavelength region of the acquired first to third spectral data, the wavelength selection step being for setting, as a factor, a difference or a ratio between feature amounts of two pieces of spectral data, among the first spectral data, the second spectral data, and the third spectral data, to select the plurality of wavelengths based on at least two or more factors; and an imaging step of imaging a subject including at least one of the first subject, the second subject, or the third subject at the plurality of wavelengths.

DESCRIPTION OF THE PREFERRED EMBODIMENTS

Hereinafter, preferred embodiments of an imaging method and a program according to the present invention will be described with reference to accompanying drawings.

First, a case where a wavelength image becomes inaccurate (wavelength reproducibility decreases) will be described below.

Conventionally, images (wavelength images) corresponding to respective wavelengths have been acquired through a multispectral camera. For example, in a multispectral camera (see FIG. 20) using polarized pixels (for example, 0°, 45°, and 90°), a wavelength image can be obtained for each wavelength by assigning different wavelengths to each of the polarized pixels. Here, in a step of generating wavelength images, interference removal is generally performed. The interference removal is processing of removing signals related to other wavelengths that have interfered during imaging, and is to remove other wavelengths, which have interfered, based on a mixing ratio measured in advance (inverse matrix operation). By appropriately performing the interference removal, it is possible to obtain an accurate wavelength image in which interference of signals of other wavelengths is suppressed.

In general, the mixing ratio is often measured before actual imaging is performed, such as in a case of manufacturing the multispectral camera, and is stored and used in a memory or the like incorporated into the multispectral camera in many cases. Therefore, a case where a mixing ratio measured in advance is different from a mixing ratio in a case where actual imaging is performed occurs. As described above, in a case where the mixing ratio measured in advance is different from the mixing ratio in a case where actual imaging is performed, the interference removal cannot be performed well, and the obtained wavelength image may become inaccurate (wavelength reproducibility decreases). One of the causes leading to a discrepancy between the mixing ratio measured in advance and the mixing ratio in a case where actual imaging is performed is a change in surrounding environment. Specifically, a discrepancy between the surrounding environment in a case of measuring the mixing ratio in advance and the surrounding environment in a case of performing actual imaging may lead to changes in flare and changes in the mixing ratio. Hereinafter, the influence of a change in surrounding environment on the wavelength image will be described using a specific example.

Figure 1:
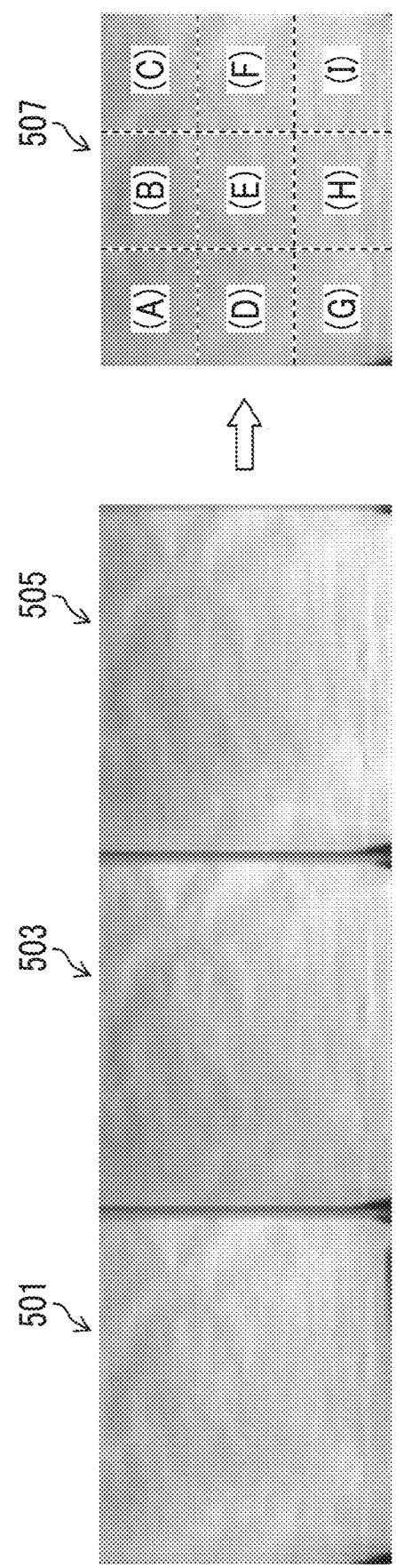
FIG. 1 is a diagram illustrating a first example in which a change in surrounding environment results in an inaccurate wavelength image.
Figure 2:
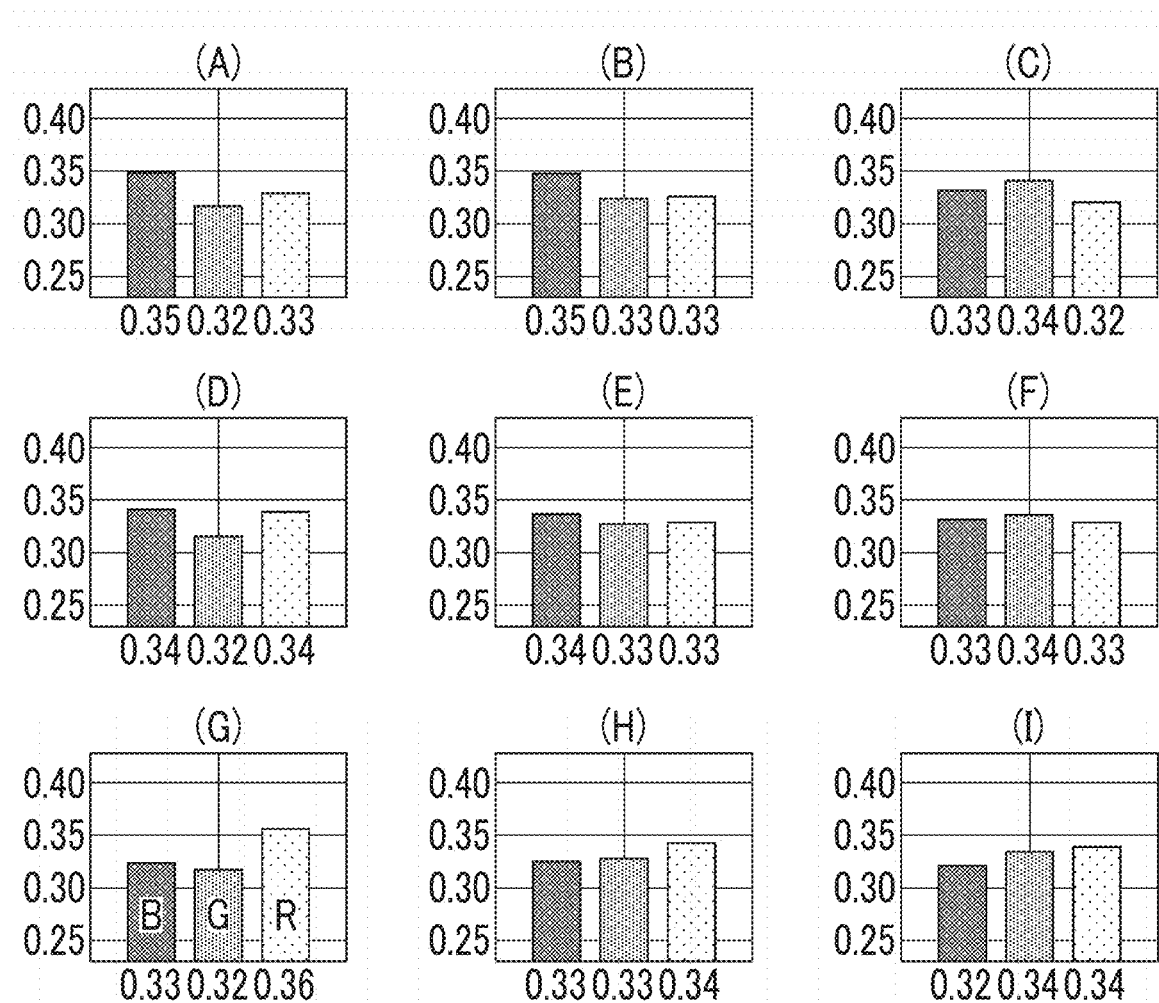
FIG. 2 is a diagram illustrating the first example in which the change in the surrounding environment results in an inaccurate wavelength image.

FIGS. 1 and 2 are diagrams illustrating a first example in which a change in surrounding environment results in an inaccurate wavelength image.

An image 501, an image 503, and an image 505 are each a wavelength image obtained by imaging a white plate having uniform reflection characteristics through a multispectral camera. The image 501 is a U wavelength image of a wavelength U, the image 503 is a V wavelength image of a wavelength V, and the image 505 is a W wavelength image of a wavelength W. In addition, an image 507 is a pseudo-color image in a case where, for example, the wavelength U is replaced with blue color (B: BLUE), the wavelength V is replaced with green color (G: GREEN), and the wavelength W is replaced with red color (R: RED). In FIG. 2, intensity ratios of luminance of the wavelength U, the wavelength V, and the wavelength W in regions (A) to (I) of the image 507 are shown by corresponding graphs (A) to (I).

In principle, in a case where a white plate having uniform reflection characteristics is imaged through a multispectral camera 100, the intensity ratios of luminance in the regions (A) to (I) are uniform. Moreover, in principle, in a case where a white plate having uniform reflection characteristics is imaged through the multispectral camera 100, the intensity ratios of luminance between the image 501 (U wavelength image), the image 503 (V wavelength image), and the image 505 (W wavelength image) are also equal. However, since the surrounding environment in a case where the image 501, the image 503, and the image 505 are actually captured and the surrounding environment in a case where the mixing ratio is measured are different from each other, as shown in the drawing, the intensity ratios of luminance indicated by each of the image 501, the image 503, and the image 505 are different from each other in the regions (A) to (I). In addition, the intensity ratios of luminance between the image 501, the image 503, and the image 505 are also not equal (for example, in the region (E), the amount of deviation of the intensity ratios between the image 501, the image 503, and the image 505 is approximately 2%).

As described above, a discrepancy in the surrounding environment between a case where the mixing ratio is measured and a case where actual imaging is performed leads to changes in flare or the like, and acquisition of an accurate wavelength image (in which wavelength reproducibility is maintained) may not be possible.

Figure 3:
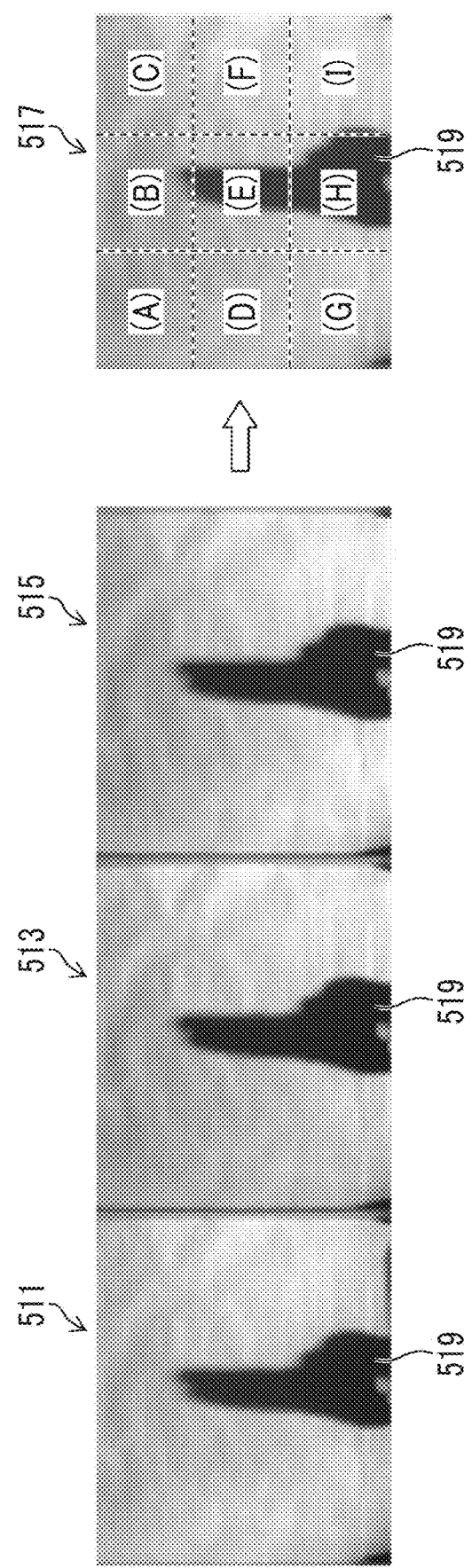
FIG. 3 is a diagram illustrating a second example in which a change in surrounding environment results in an inaccurate wavelength image.
Figure 4:
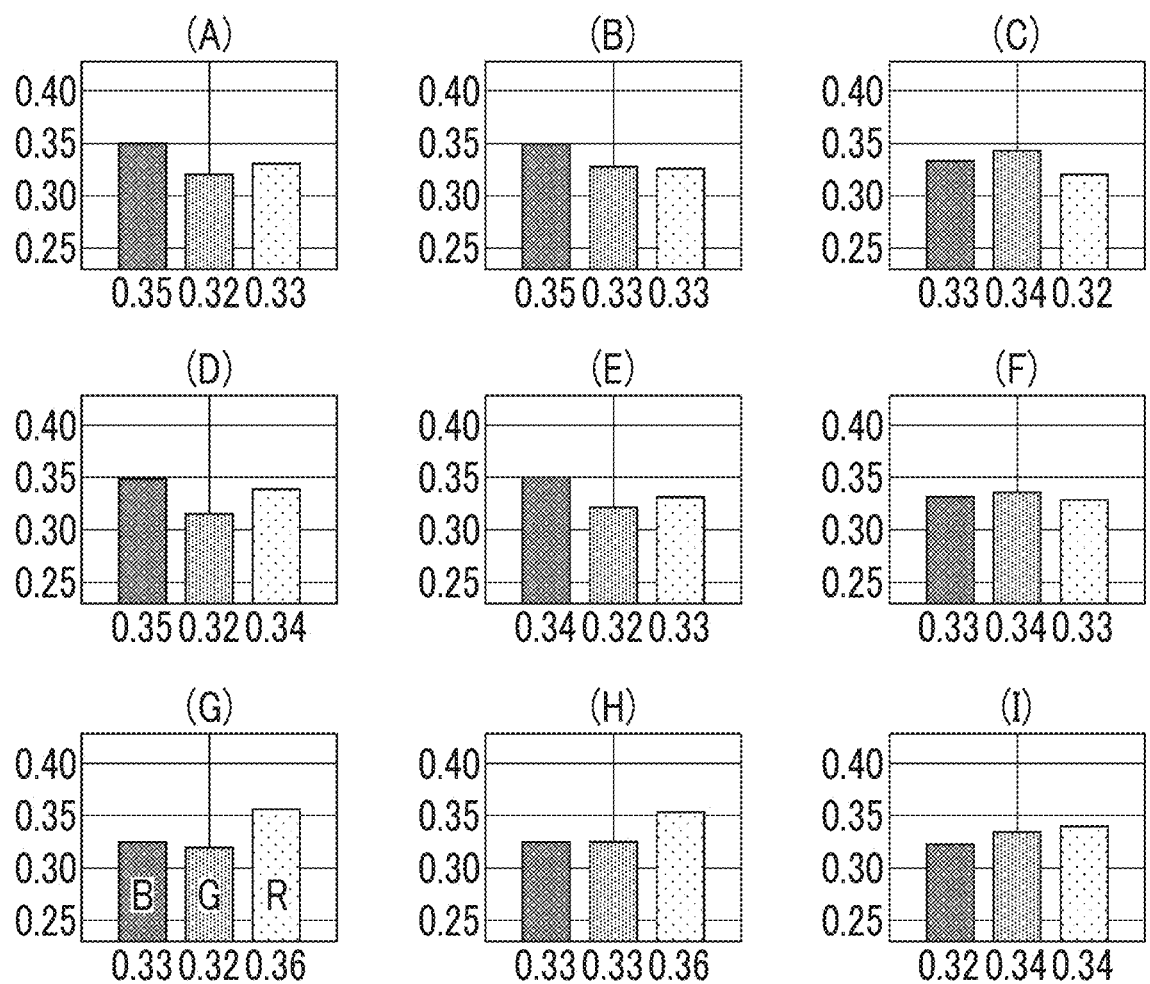
FIG. 4 is a diagram illustrating the second example in which the change in the surrounding environment results in an inaccurate wavelength image.

FIGS. 3 and 4 are diagrams illustrating a second example in which a change in surrounding environment results in an inaccurate wavelength image. In this example, a black subject 519 is imaged with a white plate having uniform reflection characteristics as a background.

An image 511 is a U wavelength image of a wavelength U, an image 513 is a V wavelength image of a wavelength V, and an image 515 is a W wavelength image of a wavelength W. In addition, an image 517 is a pseudo-color image generated under the same condition as in the case described with reference to FIG. 1. In FIG. 4, intensity ratios of luminance of the wavelength U, the wavelength V, and the wavelength W in regions (A) to (I) of the image 517 are shown by corresponding graphs (A) to (I).

Since the surrounding environment in a case where the image 511, the image 513, and the image 515 are captured and the surrounding environment in a case where the mixing ratio is measured are different from each other, as shown in the drawing, the intensity ratios of luminance indicated by each of the image 511, the image 513, and the image 515 are different from each other in the regions (A) to (I). In addition, the intensity ratios of luminance between the image 511, the image 513, and the image 515 are also not equal (for example, in the region (E), the amount of deviation of the intensity ratios of luminance between the image 511, the image 513, and the image 515 is approximately 6%).

As described above, a discrepancy in the surrounding environment between a case where the mixing ratio is acquired and a case where actual imaging is performed leads to changes in flare or the like, so that acquisition of an accurate wavelength image (in which wavelength reproducibility is maintained) may not be possible. Further, in a case where a difference in reflectivity between the background and the subject as in the black subject 519 is large, the amount of deviation of the intensity ratios of luminance between the wavelengths may become larger, which may lead to a decrease in the wavelength reproducibility.

As in the above-described example, in a case where interference removal is simply performed without accounting for the change in the mixing ratio, an inaccurate wavelength image may be acquired.

In that respect, in the embodiment to be disclosed below, by suppressing a change in flare or the like or by correcting the wavelength image in accordance with the flare or the like generated at the initial stage of imaging, an accurate wavelength image can be obtained (the wavelength reproducibility can be maintained) even in a case where the surrounding environment changes.

First Embodiment

Figure 5:
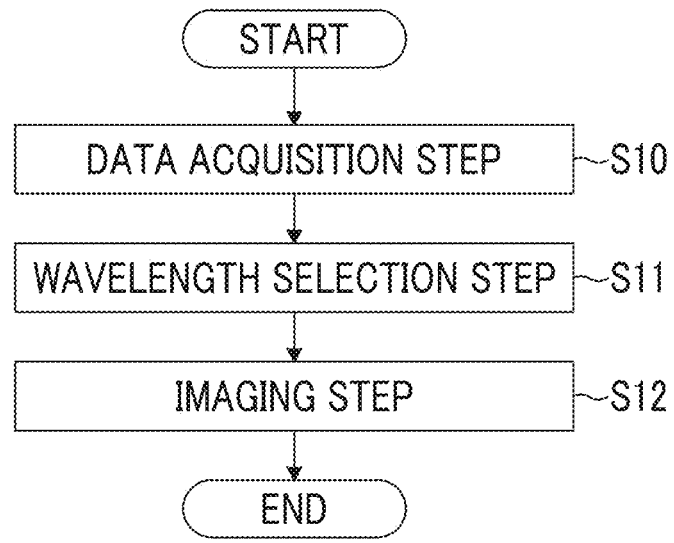
FIG. 5 is a flowchart showing an imaging method.
Figure 20:
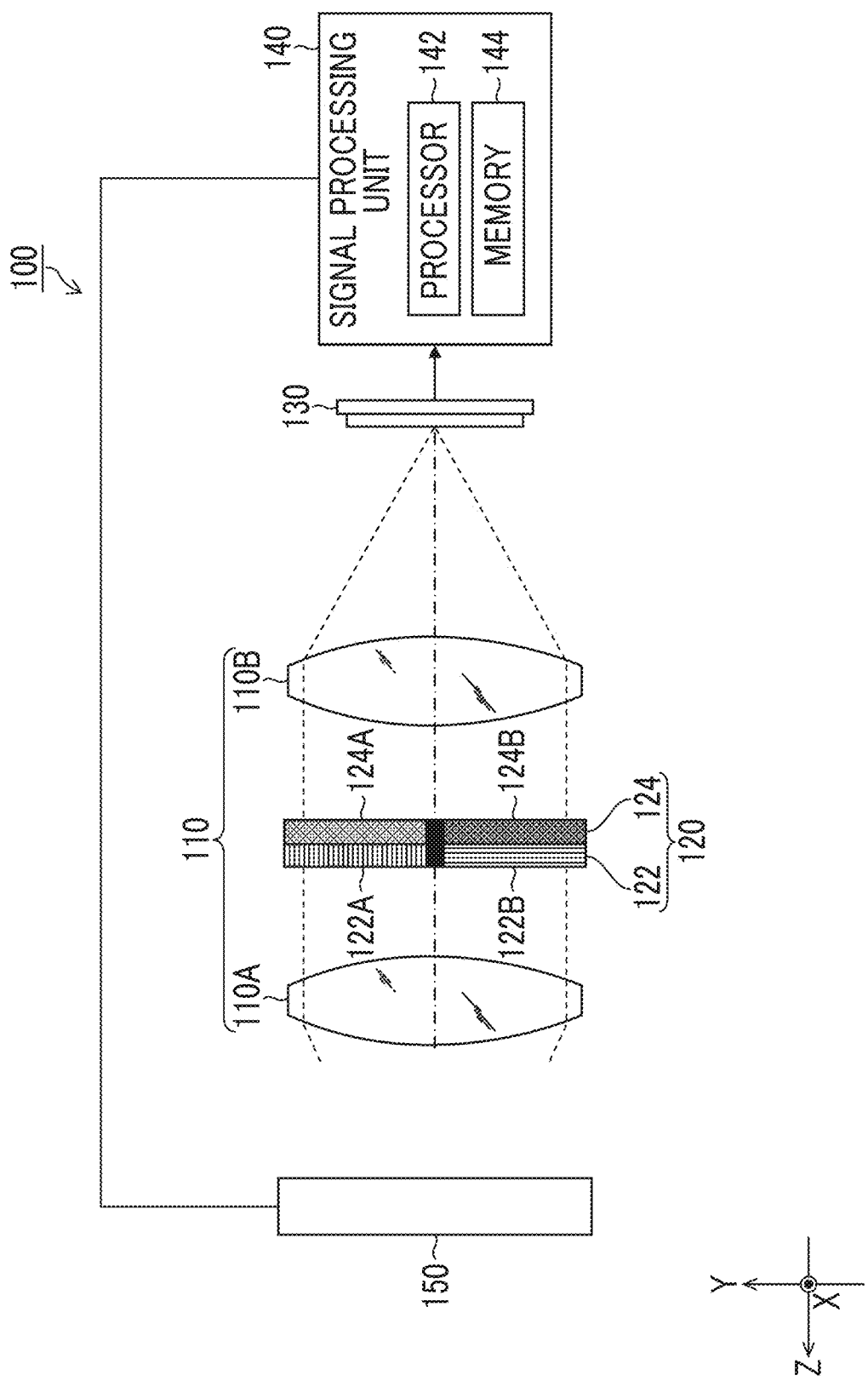
FIG. 20 is a schematic diagram showing an example of the multispectral camera.

FIG. 5 is a flowchart showing an imaging method of the embodiment of the present invention. Each step of the imaging method to be described below is performed by a processor 142 of the multispectral camera 100 (FIG. 20). In addition, the processor 142 performs each step by executing a dedicated program of the imaging method stored in a memory 144.

In a data acquisition step (step S10), the processor 142 acquires spectral data of a background 2, a first subject 3, and a second subject 4. Next, in a wavelength selection step (step S11), the processor 142 selects a plurality of wavelengths from a wavelength region (wavelength range) of the spectral data of the background 2, the first subject 3, and the second subject 4. In this example, a first wavelength $\lambda(1)$, a second wavelength $\lambda(2)$, and a third wavelength $\lambda(3)$ are selected. Next, in an imaging step (step S12), the processor 142 images a subject including at least one of the background 2, the first subject 3, or the second subject 4 by using the first wavelength λ(1), the second wavelength λ(2), and the third wavelength λ(3).

Hereinafter, each step will be described in detail.

[Data Acquisition Step]

In the data acquisition step, the processor 142 acquires the spectral data of the subject (the background 2, the first subject 3, and the second subject 4).

Figure 6:
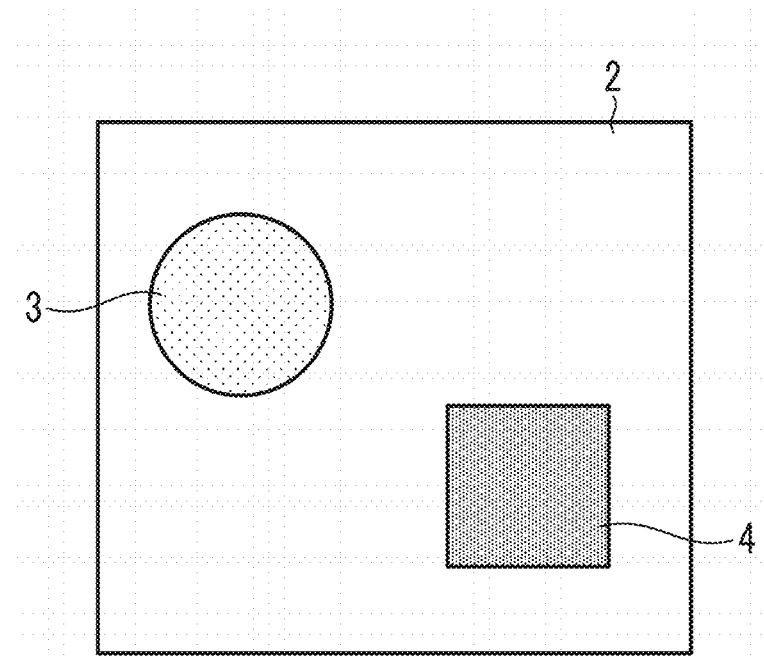
FIG. 6 is a schematic diagram showing a subject imaged by a multispectral camera.

FIG. 6 is a schematic diagram showing the subject (the first subject, the second subject, and the background (third subject)) imaged by the multispectral camera 100.

The subject is composed of the first subject 3, the second subject 4, and the background 2. The subject including at least one of the background 2, the first subject 3, or the second subject 4 is imaged by the multispectral camera 100, and sensing to identify the first subject 3 and the second subject 4 located on the background 2 is performed. Therefore, the processor 142 acquires the spectral data related to the reflectivity of the background 2, the first subject 3, and the second subject 4.

Figure 7:
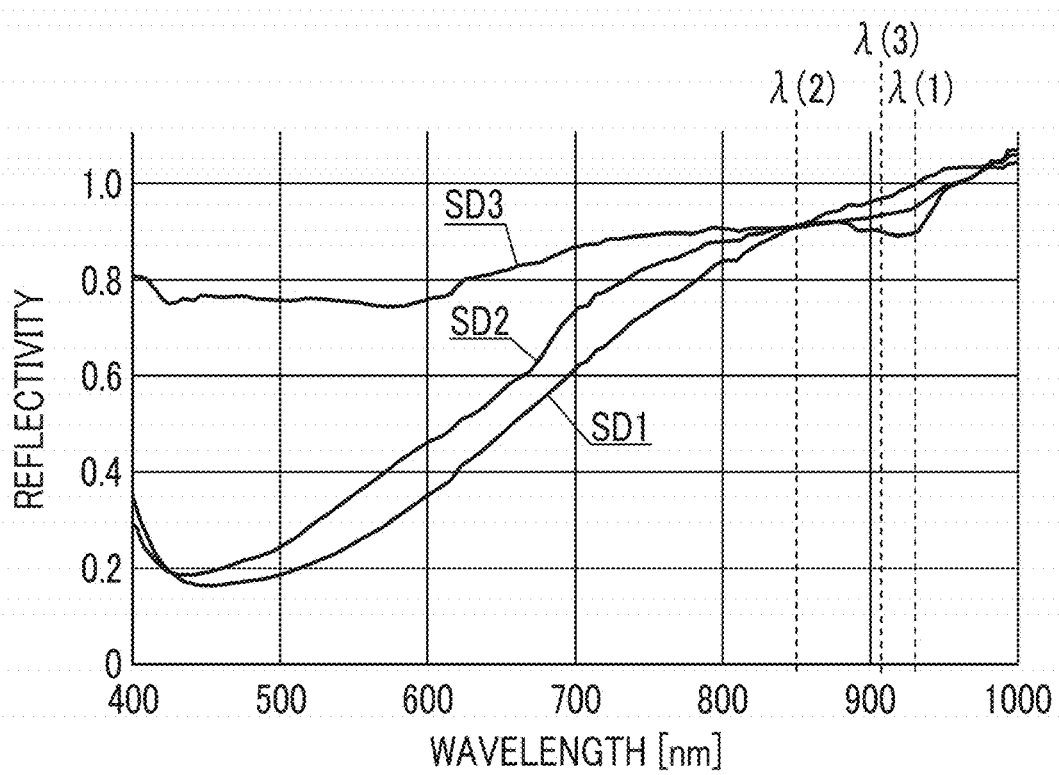
FIG. 7 is a diagram showing spectral data of a background, a first subject, and a second subject.
Figure 8:
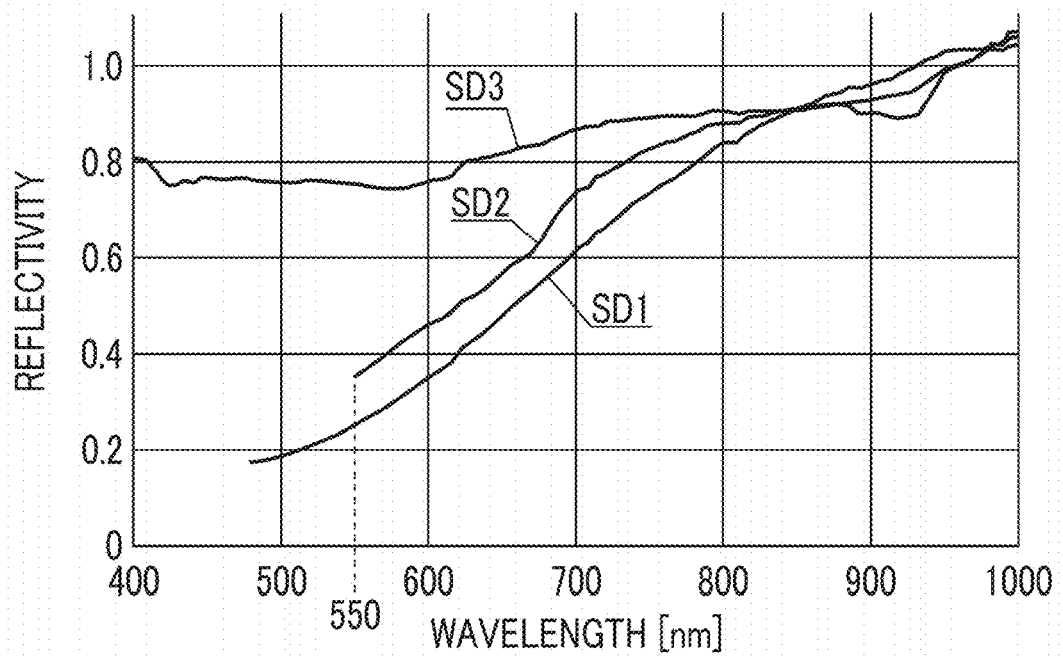
FIG. 8 is a diagram showing another spectral data of the background, the first subject, and the second subject.

FIGS. 7 and 8 are diagrams showing the spectral data of the background 2, the first subject 3, and the second subject 4.

In FIG. 7, the reflectivity corresponding to each wavelength for the background 2, the first subject 3, and the second subject 4 is displayed as the spectral data. Spectral data SD1 (first spectral data) corresponds to the first subject 3, spectral data SD2 (second spectral data) corresponds to the second subject 4, and spectral data SD3 (third spectral data) corresponds to the background 2. A wavelength region of the spectral data SD1, the spectral data SD2, and the spectral data SD3 acquired by the processor 142 is a wavelength region where a wavelength region of the spectral data SD1 and a wavelength region of the spectral data SD2 overlap each other. That is, in the case shown in FIG. 7, the wavelength regions of the spectral data SD1 and the spectral data SD2 are in a range of 400 nm to 1000 nm, the spectral data SD3 is in a wavelength region of 400 nm to 1000 nm, and the wavelength regions of the spectral data SD1 to SD3 overlap each other in a range of 400 nm to 1000 nm. Therefore, the processor 142 acquires the spectral data SD1 to SD3 in the wavelength region of 400 nm to 1000 nm.

In FIG. 8, the reflectivity corresponding to each wavelength for the background 2, the first subject 3, and the second subject 4 is displayed as the spectral data similarly to FIG. 7, and the spectral data SD1 corresponds to the first subject 3, the spectral data SD2 corresponds to the second subject 4, and the spectral data SD3 corresponds to the background 2.

In the case shown in FIG. 8, the wavelength regions of the spectral data SD1 and the spectral data SD2 overlap each other in a range of 550 nm to 1000 nm. Therefore, the wavelength region of the spectral data SD3 in a range of 550 nm to 1000 nm is sufficient, and the processor 142 acquires the spectral data SD1 to SD3 in the wavelength region of 550 nm to 1000 nm.

The processor 142 acquires the spectral data SD1 to SD3 in various aspects. For example, the spectral data SD1 to SD3 may be acquired by imaging the background 2, the first subject 3, and the second subject 4 through a hyperspectral camera and may be input to the multispectral camera 100. In addition, the spectral data SD1 to SD3 may be selected from a database in which various types of spectral data are stored, may be input to the multispectral camera 100, and may be acquired by the processor 142. Further, the spectral data SD1 to SD3 may be stored in the memory 144 of the multispectral camera 100 in advance, and the processor 142 may acquire the spectral data.

[Wavelength Selection Step]

In the wavelength selection step, the processor 142 selects the first wavelength λ(1), the second wavelength λ(2), and the third wavelength λ(3) based on the acquired spectral data SD1, spectral data SD2, and spectral data SD3. The processor 142 sets, as a factor, a difference or a ratio between feature amounts of two pieces of spectral data, among the spectral data SD1, the spectral data SD2, and the spectral data SD3, and obtains at least two or more factors to select a plurality of wavelengths. In the following description, a case where a difference in the feature amount (reflectivity) of the spectral data is set as the factor will be described.

In the related art, in the spectral data SD1, the spectral data SD2, and the spectral data SD3 described with reference to FIG. 7, a wavelength (reference wavelength) with a small difference and a wavelength with a difference at least between the spectral data SD1 of the first subject 3 and the spectral data SD2 of the second subject 4 are generally used. Therefore, conventionally, for example, 420 nm is selected as at least the second wavelength λ(2) (reference wavelength), and 500 nm is selected as the first wavelength λ(1).

However, in the present embodiment, the processor 142 selects the first wavelength λ(1), the second wavelength λ(2), and the third wavelength λ(3) based on a relationship between a difference (first factor) in the reflectivity between the spectral data SD3 and the spectral data SD1, and a difference (second factor) in the reflectivity between the spectral data SD3 and the spectral data SD2. For example, the processor 142 selects 850 nm, at which the first factor and the second factor are minimized, as the second wavelength λ(2) (reference wavelength). The processor 142 may select a wavelength, at which at least one of the first factor or the second factor is minimized, as the reference wavelength. Further, the processor 142 selects 925 nm, at which the first factor and the second factor are larger than those in the case of the second wavelength λ(2) and the first subject 3 and the second subject 4 can be identified, as the first wavelength λ(1). For example, as the first wavelength λ(1), a wavelength at which the sum of the first factor and the second factor is maximized may be selected within a predetermined range (15% or 5%) to be described below. Further, the processor 142 selects the third wavelength λ(3) as 875 nm which is between the first wavelength λ(1) and the second wavelength λ(2).

Moreover, the processor 142 can select the first wavelength λ(1) to the third wavelength λ(3) at which the first factor (the difference in the reflectivity between the spectral data SD3 and the spectral data SD1) and the second factor (the difference in the reflectivity between the spectral data SD3 and the spectral data SD2) are within a range of 15%.

Specifically, the processor 142 selects the first wavelength λ(1) to the third wavelength λ(3) that satisfy Expressions (5) and (6).

$$|β-α|/(β+α) \leq 0.15 \qquad (5)$$

$$|β-γ|/(β+γ) \leq 0.15 \qquad (6)$$

In Expressions (5) and (6), reflectivity α1 to α3 of the first subject 3 at the first wavelength λ(1) to the third wavelength λ(3) are each input as α, reflectivity β1 to β3 of the background 2 at the first wavelength λ(1) to the third wavelength λ(3) are each input as β, and reflectivity γ1 to γ3 of the second subject 4 at the first wavelength λ(1) to the third wavelength λ(3) are each input as γ. Further, in this case, the first wavelength λ(1) to the third wavelength λ(3) at which (β−α) and (β−γ) at the second wavelength λ(2) are smaller than the corresponding values at the first wavelength λ(1) and the third wavelength λ(3) are selected (Condition 1).

Figure 9:
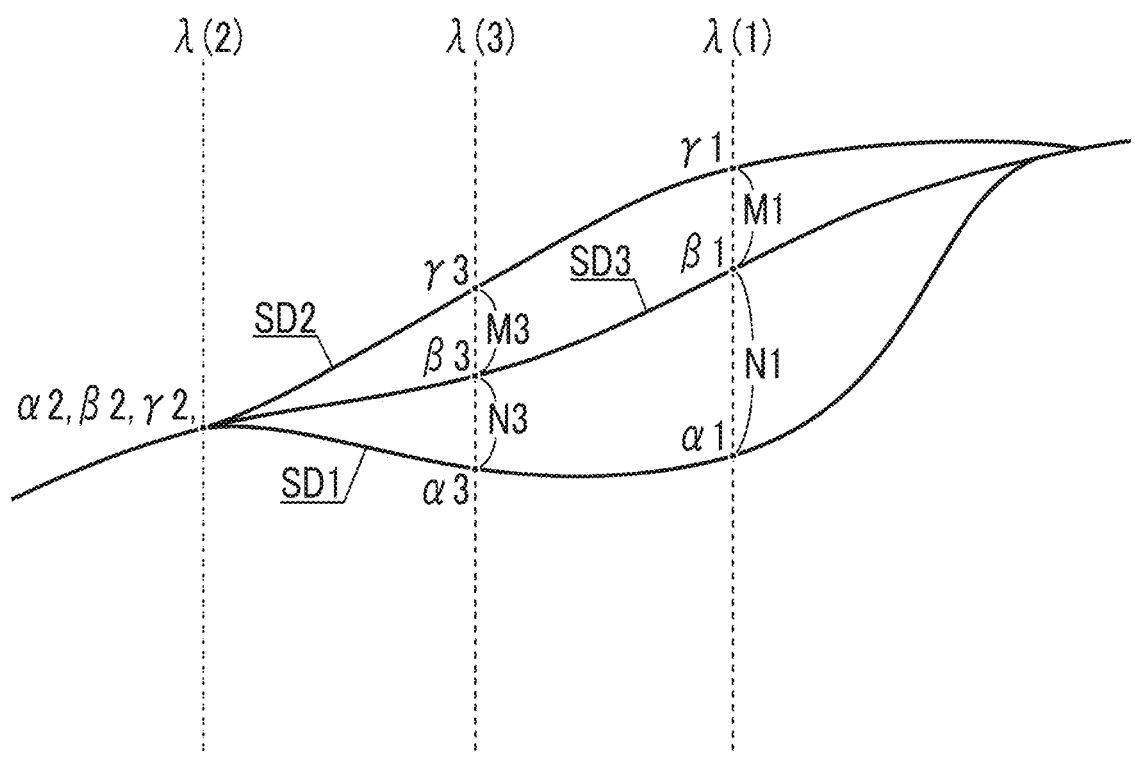
FIG. 9 is a diagram showing a case where Expression (5), Expression (6), and Condition 1 are satisfied.

FIG. 9 is a diagram showing a case where Expression (5), Expression (6), and Condition 1 are satisfied. FIG. 9 shows the spectral data SD1 to SD3 and the first wavelength λ(1) to the third wavelength λ(3).

As shown in FIG. 9, the first wavelength λ(1) to the third wavelength λ(3) at which a difference M1, a difference N1, a difference M2 (not shown because it is zero), a difference N2 (not shown because it is zero), a difference M3, or a difference N3 is within 15% are selected. Further, the first wavelength λ(1) to the third wavelength λ(3) at which the difference M2 and the difference N2 are smaller than the difference M1, the difference N1, the difference M3, and the difference N3 are selected.

Moreover, more preferably, the processor 142 can select the first wavelength λ(1) to the third wavelength λ(3) at which the first factor (the difference in the reflectivity between the spectral data SD3 and the spectral data SD1) and the second factor (the difference in the reflectivity between the spectral data SD3 and the spectral data SD2) are within a range of 5%.

Specifically, the processor 142 selects the first wavelength λ(1) to the third wavelength λ(3) that satisfy Expressions (7) and (8).

$$|\beta-\alpha|/(\beta+\alpha) \leq 0.05 \quad (7)$$

$$|\beta-\gamma|/(\beta+\gamma) \leq 0.05 \quad (8)$$

In Expressions (7) and (8), reflectivity α1 to α3 of the first subject 3 at the first wavelength λ(1) to the third wavelength λ(3) are each input as α, reflectivity β1 to β3 of the background 2 at the first wavelength λ(1) to the third wavelength λ(3) are each input as β, and reflectivity γ1 to γ3 of the second subject 4 at the first wavelength λ(1) to the third wavelength λ(3) are each input as γ. Further, in this case, the first wavelength λ(1) to the third wavelength λ(3) at which (β−α) and (β−γ) at the second wavelength λ(2) are smaller than the corresponding values at the first wavelength λ(1) and the third wavelength λ(3) are selected (Condition 1).

As described above, the processor 142 selects the first wavelength λ(1) to the third wavelength λ(3) by using the factors based on the spectral data SD1 to the spectral data SD3. As a result, since the difference from the reflectivity of the background 2 is within a certain range, an influence of a change in the surrounding environment can be suppressed.

In the above description, a case where the first wavelength λ(1) to the third wavelength λ(3) are automatically selected from the spectral data SD1 to the spectral data SD3 acquired by the processor 142 has been described. In the wavelength selection step, the processor 142 may select the first wavelength λ(1) to the third wavelength λ(3) according to another aspect. For example, the processor 142 displays the acquired spectral data SD1 to spectral data SD3 on a display unit provided on a rear surface of the multispectral camera 100, and a user selects the first wavelength λ(1) to the third wavelength λ(3) from the display, and the processor 142 may select the first wavelength λ(1) to the third wavelength λ(3) based on an instruction input from the user via an operation unit (not shown) of the multispectral camera 100.

[Imaging Step]

In the imaging step, the processor 142 images the subject including at least one of the first subject 3, the second subject 4, or the background 2 (third subject) at the first wavelength λ(1), the second wavelength λ(2), and the third wavelength λ(3).

Figure 10:
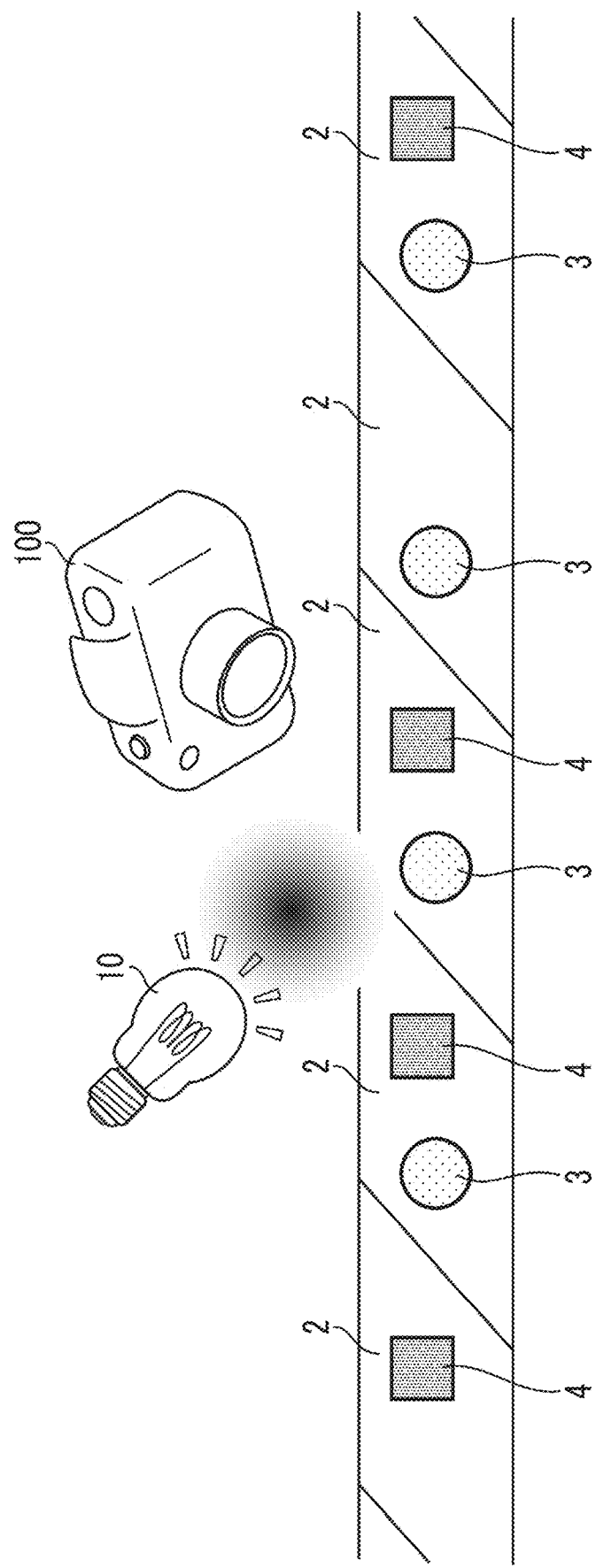
FIG. 10 is a diagram illustrating an imaging step performed by the multispectral camera.

FIG. 10 is a diagram illustrating the imaging step performed by the multispectral camera 100. FIG. 10 shows a specific example in which the background 2 is a belt conveyor and the first subject 3 and the second subject 4 are placed on the belt conveyor and continuously transported. The multispectral camera 100 images the first subject 3 and the second subject 4 that are continuously transported.

The processor 142 causes the multispectral camera 100 to image the scenes of the first subject 3 and the second subject 4 located on the background 2. In some cases, the multispectral camera 100 images a scene of only the background 2, a scene in which only the first subject 3 is located on the background 2, or a scene in which only the second subject 4 is located on the background 2. The multispectral camera 100 is set such that the first wavelength image to the third wavelength image corresponding to the first wavelength λ(1) to the third wavelength λ(3) selected in the wavelength selection step can be acquired. An illumination device 10 illuminates the background 2, the first subject 3, and the second subject 4 in accordance with imaging of the multispectral camera 100 or always (irradiation step). In the illumination device 10, a light source a, a light source b, or a light source in which the light source a and the light source b are mixed is used. Additionally, it is preferable that the illumination device 10 is a shadowless illumination device because the shadows of the first subject 3 and the second subject 4 do not have a favorable influence on the acquisition of accurate first to third wavelength images. The multispectral camera 100 performs interference removal processing on the acquired first to third wavelength images as necessary.

The multispectral camera 100 performs sensing to identify (to detect the presence or absence or the like of) the first subject 3 and the second subject 4 based on the captured first to third wavelength images.

As described above, with the imaging method of the present embodiment, the first wavelength λ(1) to the third wavelength λ(3) at which the factors of the reflectivity of the first subject 3, the second subject 4, and the background 2 are within a predetermined range are selected even in a case where a change in flare or the like has occurred due to the surrounding environment where imaging is performed, so that the influence of the change in the surrounding environment can be suppressed, and a wavelength image in which high wavelength reproducibility is maintained can be acquired.

Second Embodiment

Next, a second embodiment of the present invention will be described. In the present embodiment, in addition to the imaging method of the first embodiment described above, an intensity ratio measurement step and a correction step (first correction step) are included.

Figure 11:
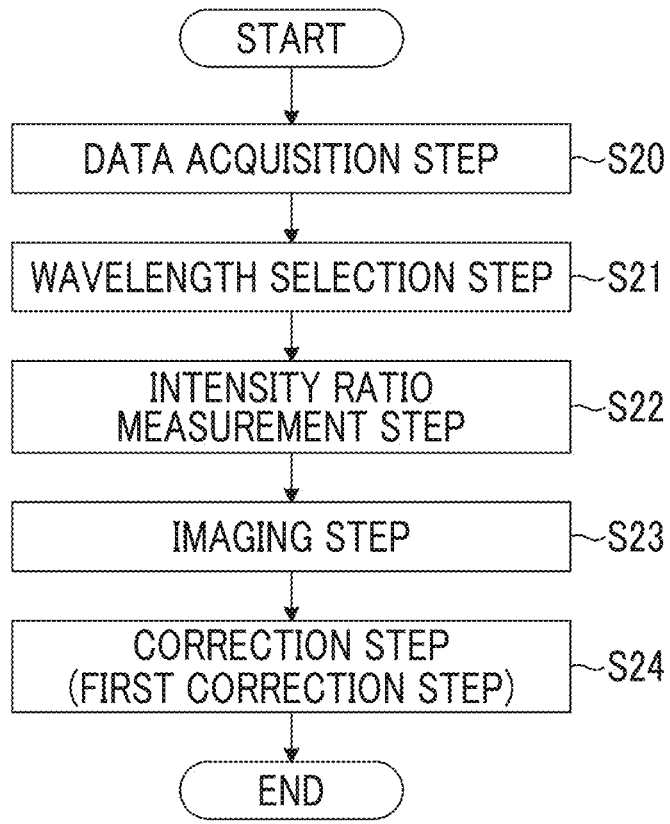
FIG. 11 is a flowchart showing another imaging method.

FIG. 11 is a flowchart showing the imaging method of the present embodiment. The imaging method to be described below is performed by the processor 142 of the multispectral camera 100. In addition, the processor 142 performs each step by executing a dedicated program of the imaging method stored in the memory 144.

In the data acquisition step (step S20), the processor 142 acquires the spectral data of the background 2, the first subject 3, and the second subject 4. Next, in the wavelength selection step (step S21), the processor 142 selects the first wavelength λ(1), the second wavelength λ(2), and the third wavelength λ(3) from the wavelength region of the spectral data of the background 2, the first subject 3, and the second subject 4. Next, in the intensity ratio measurement step (step S22), the processor 142 images the background 2 at the first wavelength λ(1), the second wavelength λ(2), and the third wavelength λ(3) to acquire the wavelength images (image data) of the first wavelength λ(1), the second wavelength λ(2), and the third wavelength λ(3) of the background 2, and measures the intensity ratios of luminance of the first wavelength λ(1) to the third wavelength λ(3) within the plurality of regions. Next, in the imaging step (step S23), the processor 142 images the subject including at least one of the background 2, the first subject 3, or the second subject 4 by using the first wavelength λ(1), the second wavelength λ(2), and the third wavelength λ(3). After that, in the first correction step (step S24), the processor 142 corrects the intensity ratios of the plurality of regions based on a first intensity ratio that is one of the measured intensity ratios.

Next, the intensity ratio measurement step and the first correction step that are feature portions of the present embodiment will be described. Since the other steps (the data acquisition step, the wavelength selection step, and the imaging step) in the present embodiment are the same as those in the first embodiment, the description thereof will not be repeated.

[Intensity Ratio Intensity Ratio Measurement Step]

In the intensity ratio measurement step, the processor 142 measures the intensity ratios of luminance of the background 2 using the first wavelength λ(1) to the third wavelength λ(3). Specifically, the processor 142 images only the background 2 with the multispectral camera 100 at the first wavelength λ(1) to the third wavelength λ(3) to acquire the first wavelength image to the third wavelength image.

Figure 12:
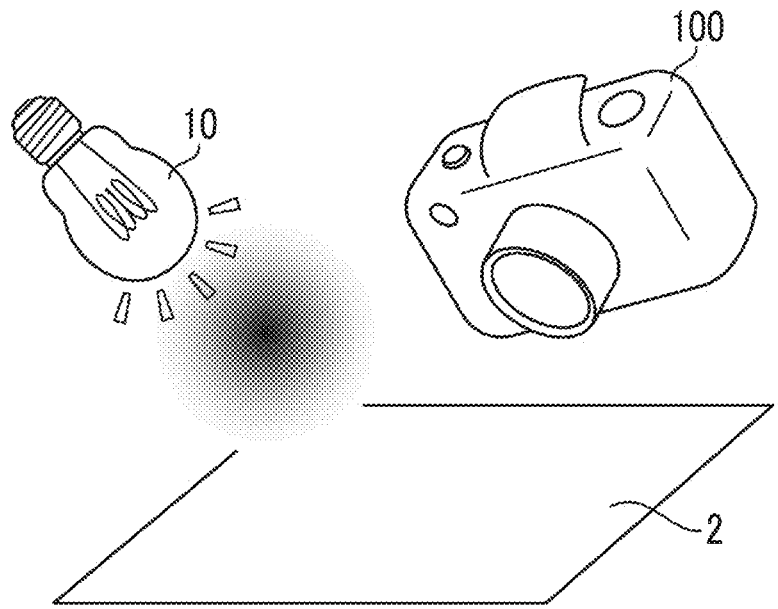
FIG. 12 is a diagram illustrating imaging of a background in an intensity ratio measurement step.

FIG. 12 is a diagram illustrating the imaging of the background 2 in the intensity ratio measurement step.

In the intensity ratio measurement step, the background 2 is imaged by the multispectral camera 100, and the first wavelength image, the second wavelength image, and the third wavelength image of the background 2 are acquired. The background 2 imaged here is the same as the background 2 imaged in the imaging step. For example, a white plate having uniform reflectivity at the first wavelength λ(1), the second wavelength λ(2), and the third wavelength λ(3) is used as the background 2. In addition, for example, a chart in which the intensity ratios of the first wavelength λ(1), the second wavelength λ(2), and the third wavelength λ(3) are constant in the plurality of regions is used as the background 2. Further, the illumination device 10 is an illumination device used in the imaging step. It is preferable that the same light source is used in the intensity ratio measurement step and the imaging step.

Figure 13:
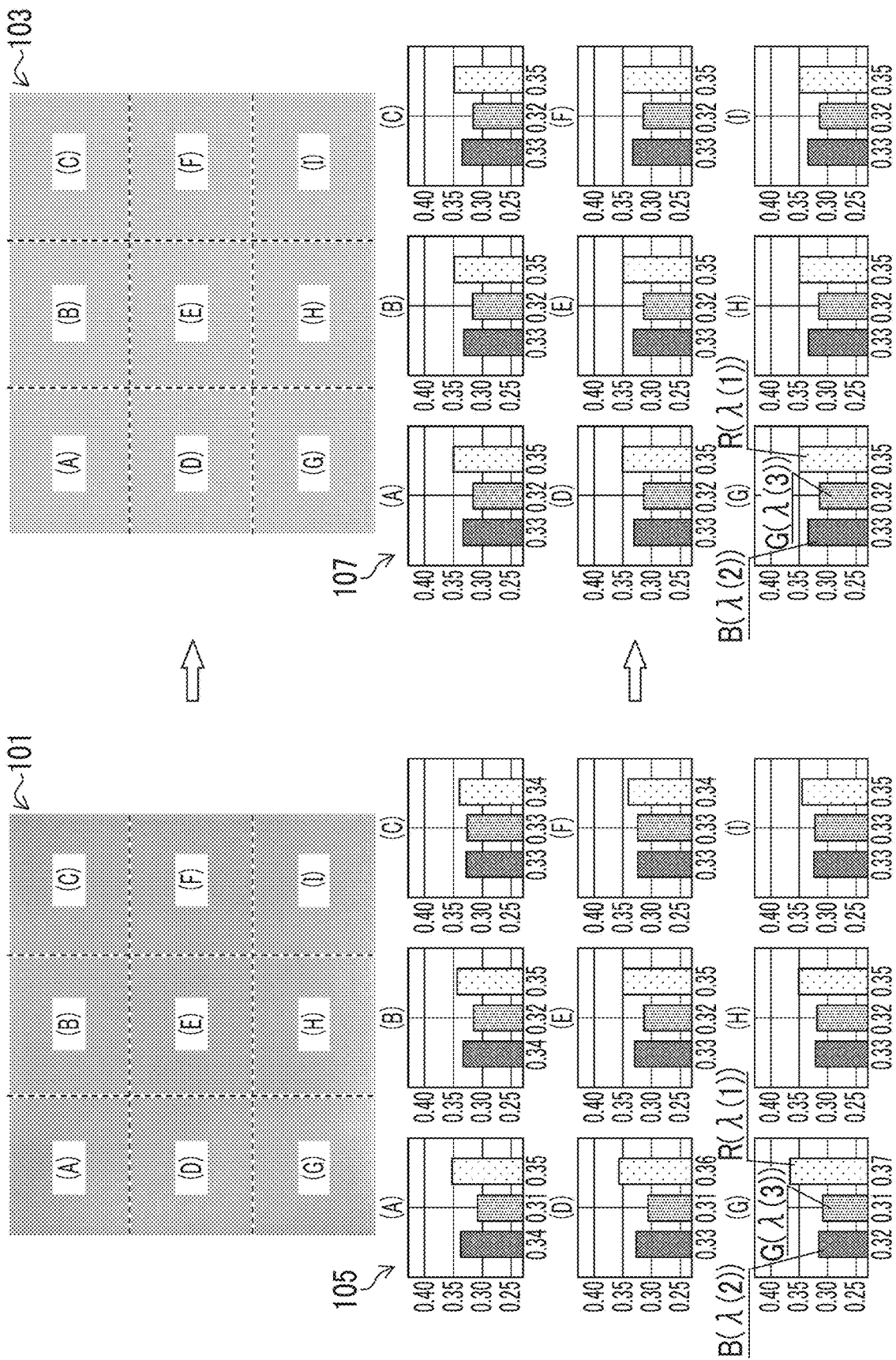
FIG. 13 is a diagram illustrating intensity ratios of luminance of the background measured in the intensity ratio measurement step and a first correction coefficient to be calculated.
Figure 14:
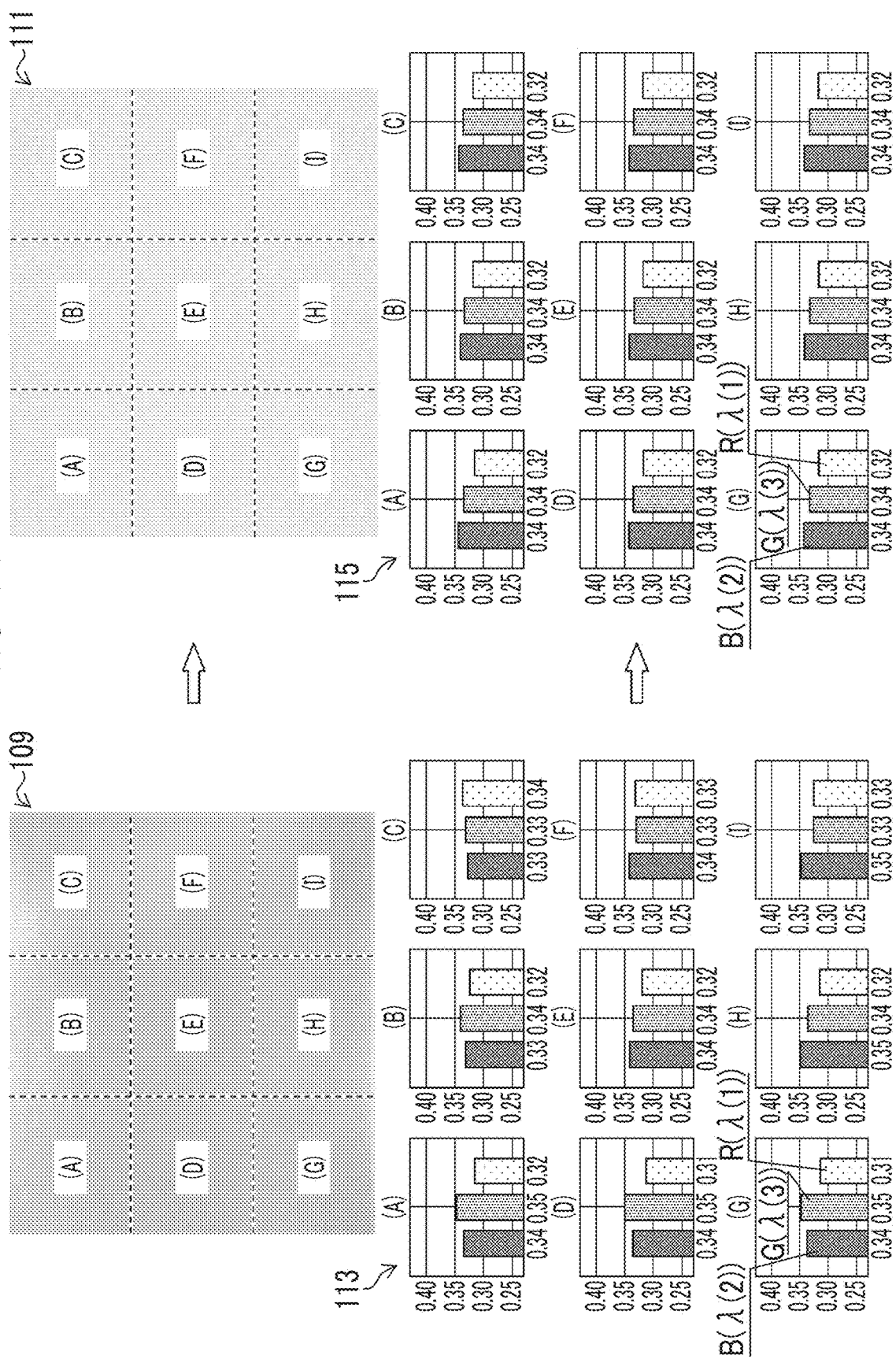
FIG. 14 is a diagram illustrating intensity ratios of luminance of the background measured in the intensity ratio measurement step and the first correction coefficient to be calculated.

FIGS. 13 and 14 are diagrams illustrating intensity ratios of luminance of the background 2 measured in the intensity ratio measurement step and a first correction coefficient to be calculated. FIG. 13 shows a measurement result measured with the light source a, and FIG. 14 shows a measurement result measured with the light source b.

A pseudo-color image 101 (FIG. 13) is generated based on the first wavelength image to the third wavelength image. Specifically, the pseudo-color image 101 is generated by overlaying the intensity ratios of luminance of the first wavelength image in red (R: RED), the intensity ratios of luminance of the second wavelength image in blue (B: BLUE), and the intensity ratios of luminance of the third wavelength image in green (G: GREEN). In addition, a reference numeral 105 indicates the graph (A) to graph (I) corresponding to the intensity ratios of luminance of the region (A) to the region (I) of the pseudo-color image 101 at the first wavelength λ(1), the second wavelength λ(2), and the third wavelength λ(3). As the intensity ratios of luminance shown in the graph (A) to the graph (I), an average or a representative value of the intensity ratios of luminance of each of the region (A) to the region (I) is shown.

As shown in the pseudo-color image 101 and the graph (A) to the graph (I) indicated by the reference numeral 105, in the first wavelength image to the third wavelength image, variations in the intensity ratios of luminance of each wavelength have occurred due to the influence of the change in the surrounding environment. Therefore, the processor 142 acquires the first correction coefficient for aligning the intensity ratios of luminance of the first wavelength λ(1), the second wavelength λ(2), and the third wavelength λ(3) in the region (A) to the region (I). For example, the processor 142 acquires the first correction coefficient for aligning the intensity ratios of the region (A) to the region (D) and the region (F) to the region (I) with the intensity ratio (first intensity ratio) of luminance of the central region (E) of the pseudo-color image 101. A pseudo-color image 103 is obtained by applying the first correction coefficient to the pseudo-color image 101. The pseudo-color image 103 has uniform intensity ratios of luminance as shown in the graph (A) to the graph (I) indicated by a reference numeral 107. That is, the intensity ratios of luminance of the region (A) to the region (I) become the same due to the first correction coefficient.

A pseudo-color image 109 (FIG. 14) is generated based on the first wavelength image to the third wavelength image, similarly to the pseudo-color image 101. In addition, a reference numeral 113 indicates the intensity ratios of luminance of the region (A) to the region (I) of the pseudo-color image 109 at the first wavelength λ(1), the second wavelength λ(2), and the third wavelength λ(3) in the graph (A) to the graph (I).

As shown in the pseudo-color image 109 and the graph (A) to the graph (I) indicated by the reference numeral 113, in the first wavelength image to the third wavelength image, variations in the intensity ratios of luminance of each wavelength have occurred due to the influence of the change in the surrounding environment. Therefore, the processor 142 acquires the first correction coefficient for aligning the intensity ratios of the region (A) to the region (D) and the region (F) to the region (I) with the intensity ratio (first intensity ratio) of luminance of the central region (E) of the pseudo-color image 109. In a case where the first correction coefficient is applied to the pseudo-color image 109, a pseudo-color image 111 is obtained. The pseudo-color image 111 has uniform intensity ratios of luminance as shown in the graph (A) to the graph (I) indicated by the reference numeral 115. That is, the intensity ratios of luminance of the region (A) to the region (I) become uniform due to the first correction coefficient.

As described above, in the intensity ratio measurement step, the intensity ratios of luminance of the first wavelength λ(1) to the third wavelength λ(3) of the background 2 are measured, and the first correction coefficient is calculated based on the measurement result. In the above description, an example has been described in which the image is divided into nine regions of 3×3 and the first correction coefficient is acquired for each region, but the present embodiment is not limited thereto. For example, the first correction coefficient may be acquired for each pixel of the image, or the first correction coefficient may be acquired in a larger region or a smaller region.

[Correction Step]

In the correction step (first correction step), the processor 142 applies the first correction coefficient acquired in the intensity ratio measurement step to the first wavelength image, the second wavelength image, and the third wavelength image, which are captured in the imaging step, to correct the intensity ratios of luminance of the region (A) to the region (I). Although the first correction coefficient is preferably applied to all of the first wavelength image to the third wavelength image, the first correction coefficient may be applied to, for example, a portion (the image data of the background 2) where the background 2 of the first wavelength image to the third wavelength image is shown. The influence of the change in the surrounding environment is suppressed in the first wavelength image, the second wavelength image, and the third wavelength image on which the correction is performed by using the first correction coefficient. Therefore, it is possible to obtain the first wavelength image to the third wavelength image in which the wavelength reproducibility is maintained, and it is possible to perform accurate sensing.

Third Embodiment

Next, a third embodiment of the present invention will be described. In the present embodiment, in addition to the imaging method of the second embodiment described above, a correction step (second correction step) is included.

Figure 15:
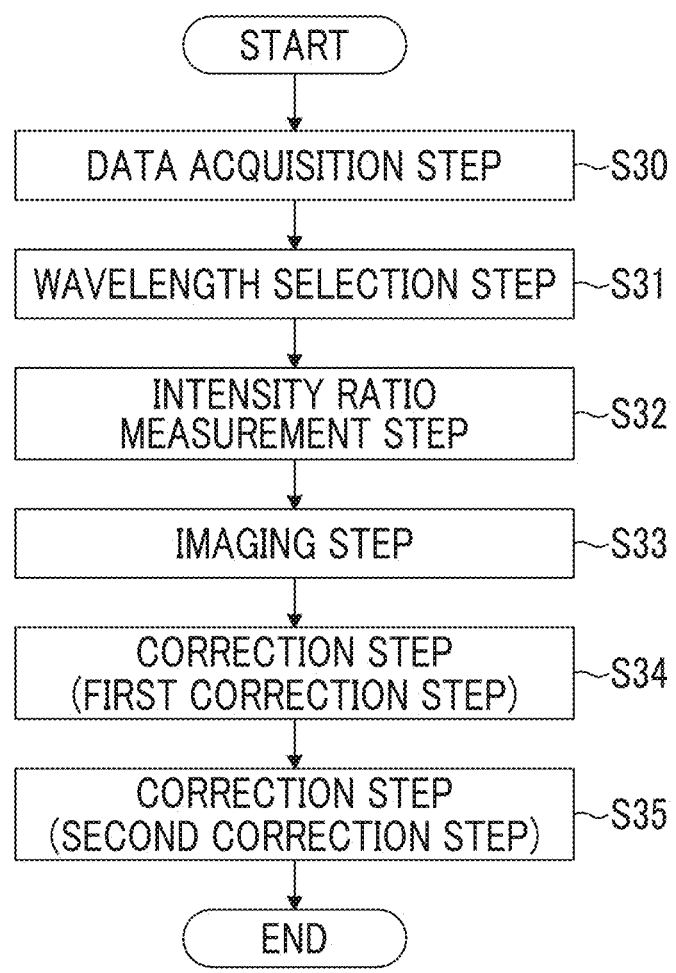
FIG. 15 is a flowchart showing still another imaging method.

FIG. 15 is a flowchart showing the imaging method of the present embodiment. The imaging method to be described below is performed by the processor 142 of the multispectral camera 100. In addition, the processor 142 performs each step by executing a dedicated program of the imaging method stored in the memory 144.

In the data acquisition step (step S30), the processor 142 acquires the spectral data of the background 2, the first subject 3, and the second subject 4. Next, in the wavelength selection step (step S31), the processor 142 selects the first wavelength $\lambda(1)$, the second wavelength $\lambda(2)$, and the third wavelength $\lambda(3)$ from the wavelength region of the spectral data of the background 2, the first subject 3, and the second subject 4. Next, in the intensity ratio measurement step (step S32), the processor 142 images the background 2 at the first wavelength $\lambda(1)$, the second wavelength $\lambda(2)$, and the third wavelength $\lambda(3)$ to acquire the wavelength images (image data) of the first wavelength $\lambda(1)$, the second wavelength $\lambda(2)$, and the third wavelength $\lambda(3)$ of the background 2, and measures the intensity ratios of luminance of the plurality of wavelengths within the plurality of regions. Next, in the imaging step (step S33), the processor 142 images the subject including at least one of the background 2, the first subject 3, or the second subject 4 by using the first wavelength $\lambda(1)$, the second wavelength $\lambda(2)$, and the third wavelength $\lambda(3)$. Next, in the first correction step (step S34), the processor 142 corrects the intensity ratios of the plurality of regions based on the first intensity ratio that is one of the intensity ratios measured in the intensity ratio measurement step. Next, in the second correction step (step S35), the processor 142 performs a correction to reduce the difference in the intensity ratios measured in the intensity ratio measurement step.

Next, the intensity ratio measurement step and the second correction step that are feature portions of the present embodiment will be described. Since the data acquisition step, the wavelength selection step, the imaging step, and the first correction step are the same as those in the first embodiment and the second embodiment, the description thereof will not be repeated here.

[Intensity Ratio Intensity Ratio Measurement Step]

In the intensity ratio measurement step of the present embodiment, a second correction coefficient is calculated in addition to the first correction coefficient. In the following description, a case where the first correction coefficient and the second correction coefficient are calculated separately will be described, but the present embodiment is not limited thereto. For example, a correction coefficient in which the first correction coefficient and the second correction coefficient are combined may be calculated.

Figure 16:
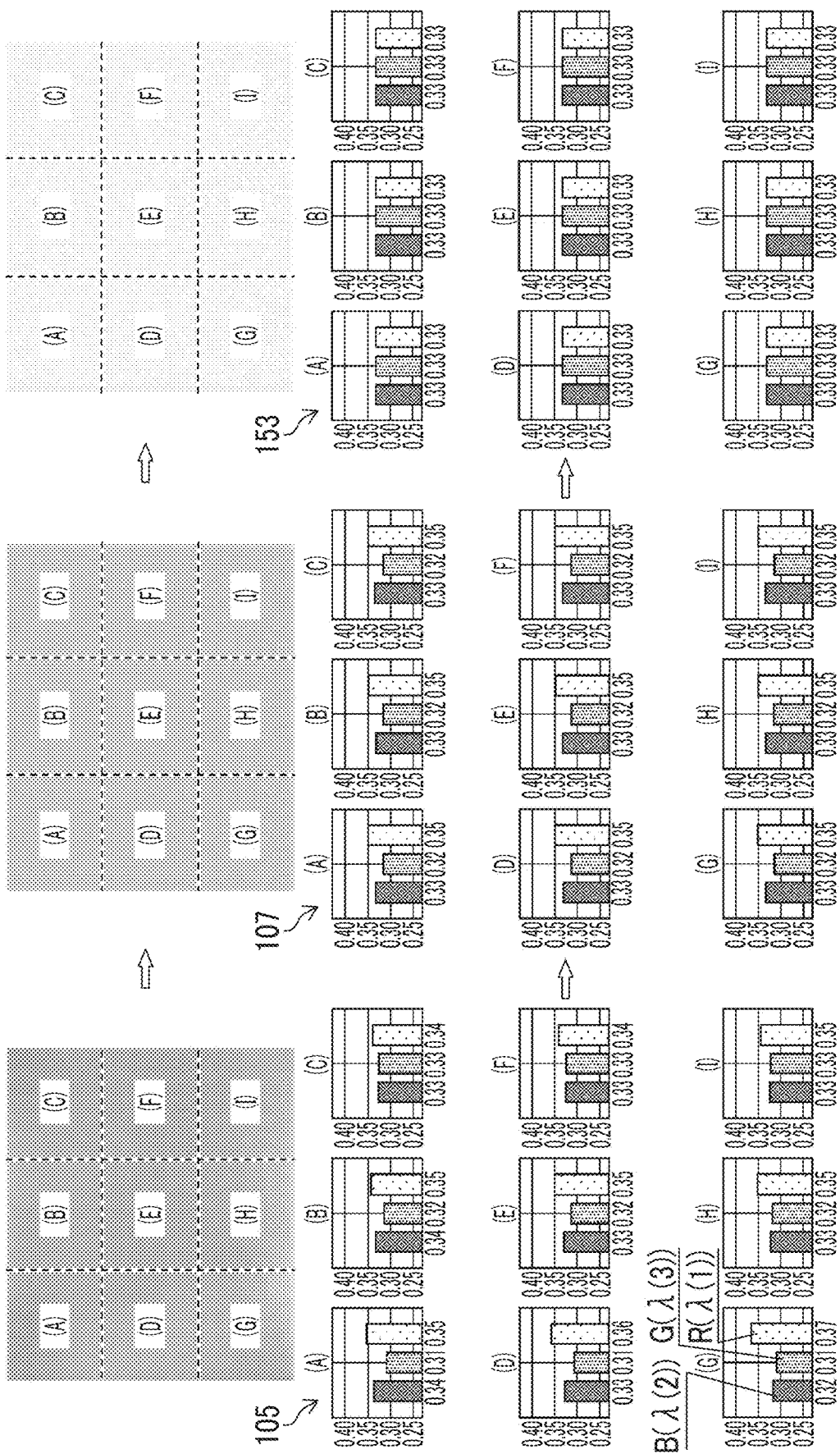
FIG. 16 is a diagram illustrating intensity ratios of luminance of the background measured in the intensity ratio measurement step, and the first correction coefficient and a second correction coefficient to be calculated.
Figure 17:
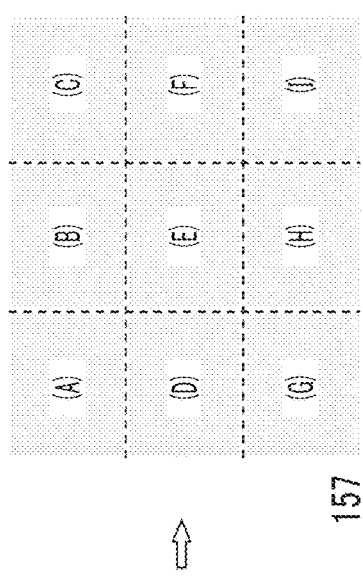
FIG. 17 is a diagram illustrating intensity ratios of luminance of the background measured in the intensity ratio measurement step, and the first correction coefficient and the second correction coefficient to be calculated.
Figure 17:
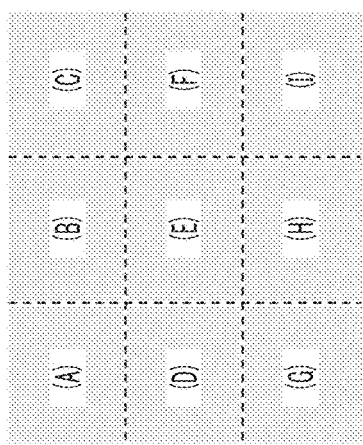
Figure 17:
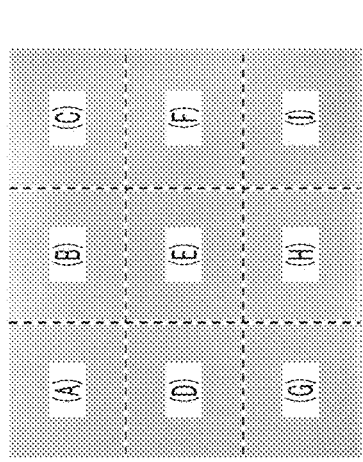

FIGS. 16 and 17 are diagrams illustrating intensity ratios of luminance of the background 2 measured in the intensity ratio measurement step, and the first correction coefficient and the second correction coefficient to be calculated. In addition, in the following description, the portions already described in FIGS. 13 and 14 will be designated by the same reference numerals, and the description thereof will not be repeated.

The second correction coefficient is a correction coefficient for reducing a difference in the intensity ratios of luminance of each wavelength of the region (A) to the region (I). For example, the second correction coefficient is a correction coefficient for making the intensity of luminance between the first wavelength $\lambda(1)$ to the third wavelength $\lambda(3)$ the same in the region (A) to the region (I).

The pseudo-color image 103 (FIG. 16) has uniform intensity ratios of luminance of the regions (A) to (I) due to the first correction coefficient. However, as shown in the graphs (A) to (I) of a reference numeral 107, the intensity ratios of luminance between the first wavelength $\lambda(1)$ to the third wavelength $\lambda(3)$ are not uniform. Specifically, in the graph (E) of the reference numeral 107, the intensity ratios are 0.33, 0.32, and 0.35. By applying the second correction coefficient, the non-uniform intensity ratios are corrected to become uniform, that is, 0.33, 0.33, and 0.33. The second correction coefficient is calculated in the same manner for the other regions. By applying the second correction coefficient to the pseudo-color image 103, a pseudo-color image 151 is obtained. In the region (A) to the region (I) of the pseudo-color image 151, the intensity ratios of luminance are 0.33, 0.33, and 0.33 as indicated by a reference numeral 153. The pseudo-color image 151 shows the original white color of the background 2.

In the pseudo-color image 111 (FIG. 17), as shown in the graphs (A) to (I) of the reference numeral 115, the intensity ratios of luminance between the first wavelength $\lambda(1)$ to the third wavelength $\lambda(3)$ are not uniform. Specifically, in the graph (E) of the reference numeral 115, the intensity ratios are 0.34, 0.34, and 0.32, but these are corrected to 0.33, 0.33, and 0.33 by applying the second correction coefficient. By applying the second correction coefficient to the pseudo-color image 111, a pseudo-color image 155 is obtained. In the region (A) to the region (I) of the pseudo-color image 155, the intensity ratios of luminance are 0.33, 0.33, and 0.33 as indicated by a reference numeral 157. The pseudo-color image 155 shows the original white color of the background 2.

As described above, in the intensity ratio measurement step, the intensity ratios of luminance of the first wavelength $\lambda(1)$ to the third wavelength $\lambda(3)$ of the background 2 are measured, and the first correction coefficient and the second correction coefficient are calculated based on the measurement result. In the above description, an example has been described in which the image is divided into nine regions of 3×3 and the second correction coefficient is acquired for each region, but the present embodiment is not limited thereto. For example, the second correction coefficient may be acquired for each pixel of the image, or the second correction coefficient may be acquired in a larger region or a smaller region.

[Correction Step (Second Correction Step)]

In the correction step (second correction step), the processor 142 uses the second correction coefficient acquired in the intensity ratio measurement step to apply the second correction coefficient to the first wavelength image, the second wavelength image, and the third wavelength image captured in the imaging step, and corrects the intensity ratios of the region (A) to the region (I). Although the second correction coefficient is preferably applied to all of the first wavelength image to the third wavelength image, the second correction coefficient may be applied to, for example, a portion (the image data of the background 2) where the background 2 of the first wavelength image to the third wavelength image is shown. By applying the second correction coefficient to the first wavelength image to the third wavelength image acquired in the imaging step to perform the correction, it is possible to perform stable sensing in which the influence of the imaging condition or the like is suppressed. The processor 142 may correct the sensitivity of an image sensor 130 (FIG. 20) based on the first correction coefficient and/or the second correction coefficient (sensitivity correction step). In a portion where the first correction coefficient or the second correction coefficient is large, the sensing result (the brightness of the wavelength image) may be output to be brighter or darker than usual brightness. Therefore, the processor 142 corrects the sensitivity of the image sensor 130 (FIG. 20) based on the first correction coefficient and/or the second correction coefficient, whereby highly accurate sensing can be performed.

Another Embodiment 1

In the above-described embodiment, an example has been described in which three different wavelengths, that is, the first wavelength $\lambda(1)$, the second wavelength $\lambda(2)$, and the third wavelength $\lambda(3)$, are selected in the wavelength selection step. However, the number of wavelengths selected in the wavelength selection step is not limited to three wavelengths as long as a plurality of wavelengths are selected. For example, in the wavelength selection step, two wavelengths may be selected, and the first wavelength $\lambda(1)$ and the second wavelength $\lambda(2)$ described above may be selected.

For example, the processor 142 can select the first wavelength $\lambda(1)$ and the second wavelength $\lambda(2)$ at which the first factor (the difference in the reflectivity between the spectral data SD3 and the spectral data SD1) and the second factor (the difference in the reflectivity between the spectral data SD3 and the spectral data SD2) are within a range of 15%.

Specifically, the processor 142 selects the first wavelength $\lambda(1)$ and the second wavelength $\lambda(2)$ that satisfy Expressions (1) and (2).

$$|\beta-\alpha|/(\beta+\alpha) \leq 0.15 \qquad (1)$$

$$|\beta-\gamma|/(\beta+\gamma) \leq 0.15 \qquad (2)$$

In Expressions (1) and (2), reflectivity $\alpha 1$ and $\alpha 2$ of the first subject 3 at the first wavelength $\lambda(1)$ and the second wavelength $\lambda(2)$ are each input as $\alpha$, reflectivity $\beta 1$ and $\beta 2$ of the background 2 at the first wavelength $\lambda(1)$ and the second wavelength $\lambda(2)$ are each input as $\beta$, and reflectivity $\gamma 1$ and $\gamma 2$ of the second subject 4 at the first wavelength $\lambda(1)$ and the second wavelength $\lambda(2)$ are each input as $\gamma$. Further, in this case, the first wavelength $\lambda(1)$ and the second wavelength $\lambda(2)$ at which $(\beta-\alpha)$ and $(\beta-\gamma)$ at the second wavelength $\lambda(2)$ are smaller than the corresponding values at the first wavelength $\lambda(1)$ are selected (Condition 2).

Moreover, more preferably, the processor 142 can select the first wavelength $\lambda(1)$ and the second wavelength $\lambda(2)$ at which the first factor (the difference in the reflectivity between the spectral data SD3 and the spectral data SD1) and the second factor (the difference in the reflectivity between the spectral data SD3 and the spectral data SD2) are within a range of 5%.

Specifically, the processor 142 selects the first wavelength $\lambda(1)$ and the second wavelength $\lambda(2)$ that satisfy Expressions (3) and (4).

$$|\beta-\alpha|/(\beta+\alpha) \leq 0.05 \qquad (3)$$

$$|\beta-\gamma|/(\beta+\gamma) \leq 0.05 \qquad (4)$$

In Expressions (3) and (4), reflectivity $\alpha 1$ and $\alpha 2$ of the first subject 3 at the first wavelength $\lambda(1)$ and the second wavelength $\lambda(2)$ are each input as $\alpha$, reflectivity $\beta 1$ and $\beta 2$ of the background 2 at the first wavelength $\lambda(1)$ and the second wavelength $\lambda(2)$ are each input as $\beta$, and reflectivity $\gamma 1$ and $\gamma 2$ of the second subject 4 at the first wavelength $\lambda(1)$ and the second wavelength $\lambda(2)$ are each input as $\gamma$. Further, in this case, the first wavelength $\lambda(1)$ and the second wavelength $\lambda(2)$ at which $(\beta-\alpha)$ and $(\beta-\gamma)$ at the second wavelength $\lambda(2)$ are smaller than the corresponding values at the first wavelength $\lambda(1)$ are selected (Condition 2).

As described above, in the present embodiment, the two wavelengths (the first wavelength $\lambda(1)$ and the second wavelength $\lambda(2)$) are selected in the wavelength selection step. As described above, by selecting any number of the plurality of wavelengths and performing imaging, the user can acquire the desired number of wavelength images.

Another Embodiment 2

In the above-described embodiments, the background 2 is a predetermined white plate. However, in the present embodiment, the processor 142 issues a notification of the optimal background based on the reflectivity (spectral data) of the first subject 3 and the second subject 4 (notification step).

The memory 144 of the multispectral camera 100 of the present embodiment stores a plurality of substitutional subjects (a plurality of backgrounds) that are substitutable with the background 2 and spectral data of each of the plurality of substitutional subjects. Then, the processor 142 issues a notification of, as the background to be recommended, one substitutional subject (background) among the plurality of substitutional subjects based on the spectral data SD1 of the first subject 3 and the spectral data SD2 of the second subject 4. The processor 142 can issue a notification of the substitutional subject on the display unit (not shown) provided on the rear surface of the multispectral camera 100. Further, the multispectral camera 100 may comprise a background display device 150 that variably displays the background 2 (see FIG. 20). The background display device 150 is composed of, for example, a liquid crystal display or the like, and can display the desired color as the background under the control of the processor 142 (third subject variable display step). As described above, by changing the background color with the background display device 150, it is possible to change the background color for each location, for example, in a case where subjects having completely different factors of spectral reflectivity are simultaneously detected, or it is possible to easily change the background color, for example, in a case where it is desired to use the multispectral camera 100 having the same setting for different applications (for example, detection of other subjects).

Figure 18:
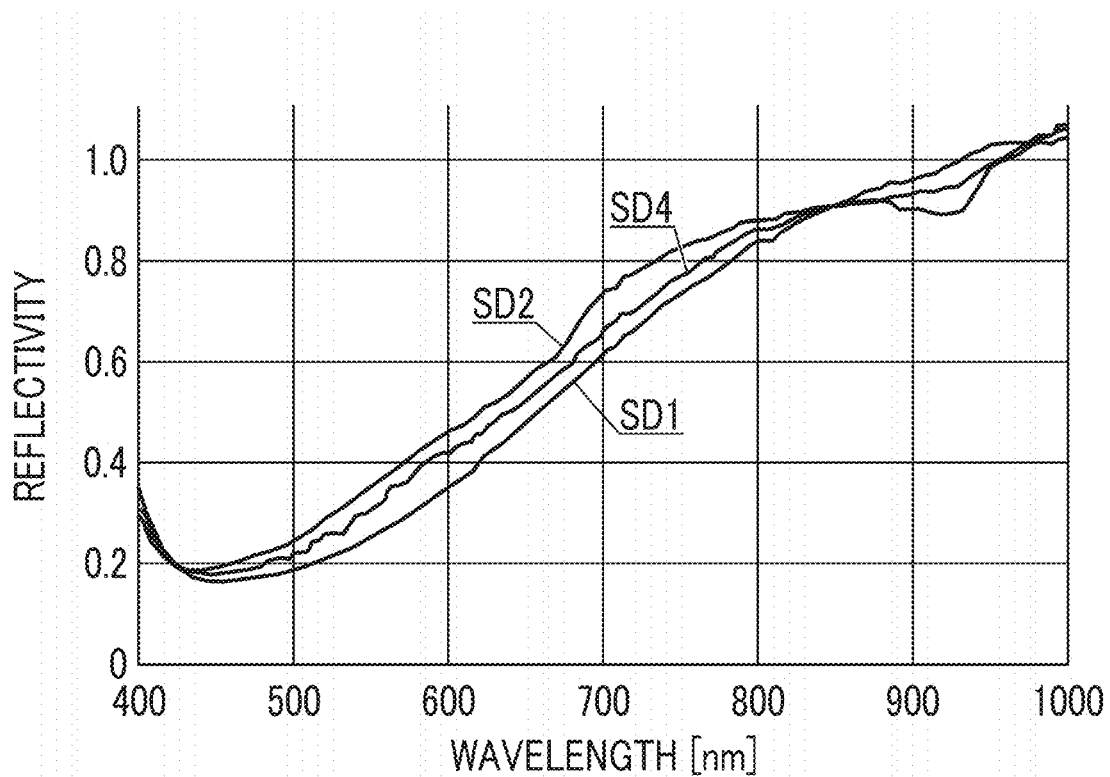
FIG. 18 is a diagram illustrating an example of a background to be recommended.
Figure 19:
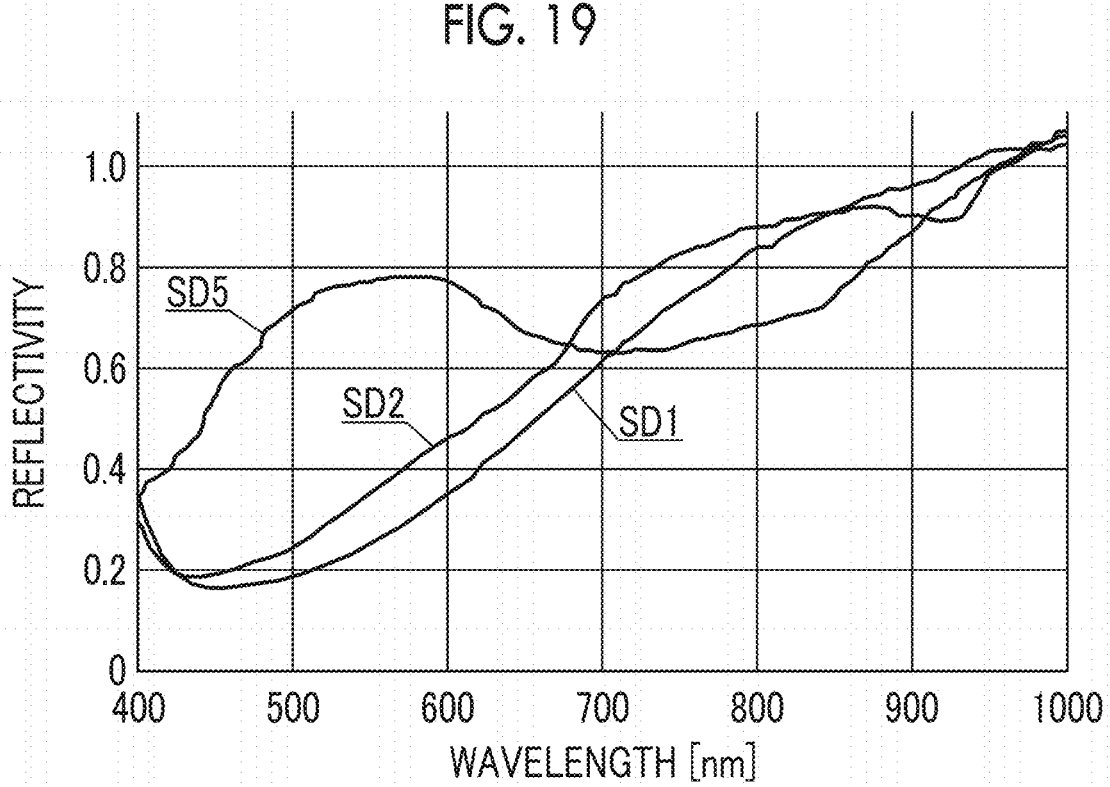
FIG. 19 is a diagram illustrating another example of the background to be recommended.

FIGS. 18 and 19 are diagrams illustrating examples of backgrounds to be recommended.

FIG. 18 shows spectral data SD4 (fourth spectral data) of the background to be recommended. The background having the spectral data SD4 is selected as a recommended subject based on the spectral data SD1 of the first subject 3 and the spectral data SD2 of the second subject 4 and is issued as a notification. In the spectral data SD4, a difference in the reflectivity between the spectral data SD1 and the spectral data SD2 is small in a wavelength region of 400 nm to 1000 nm. The use of the background having the spectral data SD4 makes it possible to select a plurality of wavelengths, at which imaging is performed by the multispectral camera 100, in a wide wavelength range.

FIG. 19 shows spectral data SD5 of the background to be recommended. The background having the spectral data SD5 is selected as a recommended subject based on the spectral data SD1 of the first subject 3 and the spectral data SD2 of the second subject 4 and is issued as a notification. In the spectral data SD5, since the spectral data SD1 and the spectral data SD2 intersect with each other at a plurality of portions, there are portions where the difference in the reflectivity between the spectral data SD1 and the spectral data SD2 is small at a plurality of portions. The use of the background having the spectral data SD5 makes it possible to perform imaging at a plurality of portions (wavelength regions).

<Others>

Next, the multispectral camera 100 used in the above-described imaging method will be described.

[Multispectral Camera]

Figure 21:
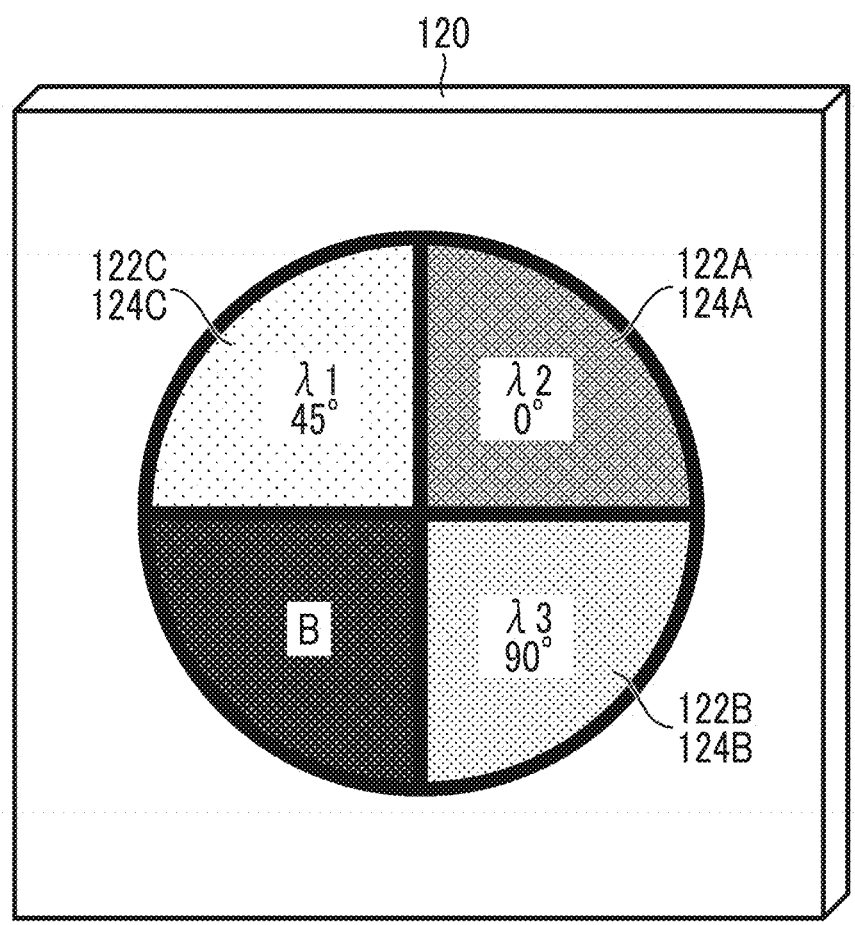
FIG. 21 is a schematic diagram showing an example of a filter unit provided in the multispectral camera.

FIG. 20 is a schematic diagram showing an example of the multispectral camera 100 used in the imaging method of the embodiment of the present invention. Further, FIG. 21 is a schematic diagram showing an example of a filter unit 120 provided in the multispectral camera 100.

The multispectral camera 100 shown in FIG. 20 is composed of an imaging optical system 110 including lenses 110A and 110B and the filter unit 120, an image sensor (imaging element) 130, and a signal processing unit 140. In addition, the background display device 150 may be connected to the multispectral camera 100. The background display device 150 is connected to the signal processing unit 140 and is controlled by the processor 142. A bandpass filter unit 124 provided in the filter unit 120 (FIG. 21) is composed of a first bandpass filter (first wavelength selection element) 124A, a second bandpass filter (second wavelength selection element) 124B, and a third band pass filter (third wavelength selection element) 124C that transmit light in wavelength regions with the first wavelength λ(1), the second wavelength λ(2), and the third wavelength λ(3) suitable for identifying the first subject 3 and the second subject 4, as respective central wavelengths. The filter unit 120 has four pupil regions (a first pupil region to a fourth pupil region), and the fourth pupil region, which is not used, is shielded by a shielding member B (see FIG. 21).

It is preferable that the filter unit 120 is composed of a polarization filter unit 122 and the bandpass filter unit 124 and is disposed at a pupil position of the imaging optical system 110 or in the vicinity of the pupil position.

The polarization filter unit 122 consists of a first polarization filter 122A, a second polarization filter 122B, and a third polarization filter 122C that linearly polarize light transmitted through the first pupil region, the second pupil region, and the third pupil region of the imaging optical system 110, respectively. For example, a polarization direction of the first polarization filter 122A is set to 0°, a polarization direction of the second polarization filter 122B is set to 90°, and a polarization direction of the third polarization filter 122C is set to 45°.

The bandpass filter unit 124 is composed of the first bandpass filter 124A, the second bandpass filter 124B, and the third band pass filter 124C for selecting the wavelength regions of the light transmitted through the first pupil region, the second pupil region, and the third pupil region of the imaging optical system 110, respectively. Therefore, the light transmitted through the first pupil region of the imaging optical system 110 is linearly polarized by the first polarization filter 122A, and only the light in the wavelength region including the first wavelength λ(1) is transmitted by the first bandpass filter 124A. Meanwhile, the light transmitted through the second pupil region of the imaging optical system 110 is linearly polarized (linearly polarized in a direction different from that of the first polarization filter 122A by 90°) by the second polarization filter 122B, and only the light in the wavelength region including the second wavelength λ(2) is transmitted by the second bandpass filter 124B. Further, the light transmitted through the third pupil region of the imaging optical system 110 is linearly polarized by the third polarization filter 122C, and only the light in the wavelength region including the third wavelength λ(3) is transmitted by the third band pass filter 124C.

The image sensor 130 is configured such that the first polarization filter, the second polarization filter, and the third polarization filter having polarization directions of 0°, 45°, and 90° are regularly disposed at a plurality of pixels consisting of photoelectric conversion elements arranged in a two-dimensional manner.

It should be noted that the first polarization filter 122A and the first polarization filter of the image sensor 130 have the same polarization direction, the second polarization filter 122B and the second polarization filter of the image sensor 130 have the same polarization direction, and the third polarization filter 122C and the third polarization filter of the image sensor 130 have the same polarization direction.

The signal processing unit 140 reads out a pixel signal from a pixel of the image sensor 130, at which the first polarization filter is disposed, to acquire a narrow and elongated band first wavelength image, which is wavelength-selected by the first bandpass filter 124A, reads out a pixel signal from a pixel of the image sensor 130, at which the second polarization filter is disposed, to acquire a narrowband second wavelength image, which is wavelength-selected by the second bandpass filter 124B, and reads out a pixel signal from a pixel of the image sensor 130, at which the third polarization filter is disposed, to acquire a narrowband third wavelength image, which is wavelength-selected by the third band pass filter 124C.

The first wavelength image, the second wavelength image, and the third wavelength image acquired by the signal processing unit 140 are images suitable for the separation between the first subject 3 and the second subject 4. For example, by combining the first wavelength image, the second wavelength image, and the third wavelength image, it is possible to create a composite image in which a dynamic range is expanded and the sensing performance is enhanced. The signal processing unit 140 performs interference removal processing of the first wavelength image, the second wavelength image, and the third wavelength image, as necessary.

In the above-described embodiments, as the hardware structure of the processing unit that executes various types of processing, various processors to be described below are used. The various processors include a central processing unit (CPU) which is a general-purpose processor that executes software (programs) to function as various processing units, a programmable logic device (PLD) which is a processor whose circuit configuration can be changed after manufacturing such as a field programmable gate array (FPGA), a dedicated electrical circuit which is a processor having a dedicated circuit configuration designed to execute specific processing such as an application specific integrated circuit (ASIC), and the like.

One processing unit may be composed of one of these various processors or may be composed of two or more processors of the same type or different types (for example, a plurality of FPGAs or a combination of a CPU and an FPGA). Alternatively, a plurality of processing units may be composed of one processor. Examples of the configuration in which a plurality of processing units are composed of one processor include a first aspect in which one or more CPUs and software are combined to configure one processor and the processor functions as the plurality of processing units, as typified by a computer, such as a client or a server. Examples of the configuration include a second aspect in which a processor that realizes functions of the entire system including a plurality of processing units with one integrated circuit (IC) chip is used, as typified by a system on chip (SoC). As described above, various processing units are composed of one or more of the above-described various processors, as the hardware structure.

Furthermore, as the hardware structure of these various processors, more specifically, an electrical circuit (circuitry) in which circuit elements such as semiconductor elements are combined is used.

Each of the configurations and functions described above can be appropriately realized by using any hardware, software, or a combination of both. For example, the present invention can also be applied to a program for causing a computer to execute the above-described processing steps (processing procedures), a computer-readable recording medium (non-transitory recording medium) on which such a program is recorded, or a computer on which such a program can be installed.

Although the examples of the present invention have been described above, it goes without saying that the present invention is not limited to the above-described embodiments and various modifications can be made without departing from the spirit of the present invention.

EXPLANATION OF REFERENCES

2: background
3: first subject
4: second subject
10: illumination device
100: multispectral camera
110: imaging optical system
110A: lens
110B: lens
120: filter unit
122: polarization filter unit
122A: first polarization filter
122B: second polarization filter
122C: third polarization filter
124: bandpass filter unit
124A: first bandpass filter
124B: second bandpass filter
124C: third band pass filter
130: image sensor
140: signal processing unit
142: processor
144: memory
150: background display device

What is claimed is:

1. An imaging method of imaging a subject through a multispectral camera including a processor, the imaging method comprising:
causing the processor to perform:
a data acquisition step of acquiring first spectral data of a first subject, second spectral data of a second subject, and third spectral data of a third subject;
a wavelength selection step of selecting a plurality of wavelengths from a wavelength region of the acquired first to third spectral data, the wavelength selection step being for setting, as a factor, a difference or a ratio between feature amounts of two pieces of spectral data, among the first spectral data, the second spectral data, and the third spectral data, to select the plurality of wavelengths based on at least two or more factors; and
an imaging step of imaging a subject including at least one of the first subject, the second subject, or the third subject at the plurality of wavelengths,
wherein the factor includes a first factor that is a difference or a ratio between feature amounts of the first spectral data and of the third spectral data, and a second factor that is a difference or a ratio between feature amounts of the second spectral data and of the third spectral data, and the plurality of wavelengths are selected based on the first factor and the second factor.

2. The imaging method according to claim 1,
wherein the wavelength region of the first to third spectral data is a wavelength region where at least a wavelength region of the first spectral data and a wavelength region of the second spectral data overlap each other.

3. The imaging method according to claim 1,
wherein one of the plurality of wavelengths is a wavelength at which at least one of the first factor or the second factor is minimized.

4. The imaging method according to claim 1,
wherein a step of using the plurality of wavelengths selected in the wavelength selection step to measure intensity ratios of luminance of the plurality of wavelengths within a plurality of regions of image data of the third subject, and a correction step of correcting at least the image data of the third subject based on the intensity ratios are further provided.

5. The imaging method according to claim 4,
wherein the correction step includes a first correction step of correcting the intensity ratios of the plurality of regions based on a first intensity ratio that is one of the measured intensity ratios.

6. The imaging method according to claim 4,
wherein the correction step includes a second correction step of performing a correction to reduce a difference in the measured intensity ratios.

7. The imaging method according to claim 4,
wherein the correction step includes a first correction step of correcting the intensity ratios of the plurality of regions based on a first intensity ratio that is one of the measured intensity ratios, and a second correction step of performing a correction to reduce a difference in the measured intensity ratios.

8. The imaging method according to claim 1,
wherein the third subject has constant intensity ratios of luminance of the plurality of wavelengths, which are selected in the wavelength selection step, in a plurality of regions.

9. The imaging method according to claim 1,
wherein a first wavelength and a second wavelength are selected in the wavelength selection step, reflectivity $\alpha$ of the first subject and reflectivity $\beta$ of the third subject at the first wavelength and the second wavelength satisfy a relationship of Expression (1), reflectivity $\gamma$ of the second subject and the reflectivity $\beta$ of the third subject at the first wavelength and the second wavelength satisfy a relationship of Expression (2), and $(\beta-\alpha)$ and $(\beta-\gamma)$ at the second wavelength are smaller than $(\beta-\alpha)$ and $(\beta-\gamma)$ at the first wavelength, Expressions (1) and (2) being represented by:

$$|\beta-\alpha|/(\beta+\alpha) \leq 0.15 \quad (1); \text{and}$$

$$|\beta-\gamma|/(\beta+\gamma) \leq 0.15 \quad (2).$$

10. The imaging method according to claim 1,
wherein a first wavelength and a second wavelength are selected in the wavelength selection step, reflectivity $\alpha$ of the first subject and reflectivity $\beta$ of the third subject at the first wavelength and the second wavelength satisfy a relationship of Expression (3), reflectivity $\gamma$ of the second subject and the reflectivity $\beta$ of the third subject at the first wavelength and the second wavelength satisfy a relationship of Expression (4), and $(\beta-\alpha)$ and $(\beta-\gamma)$ at the second wavelength are smaller than $(\beta-\alpha)$ and $(\beta-\gamma)$ at the first wavelength, Expressions (3) and (4) being represented by:

$$|\beta-\alpha|/(\beta+\alpha) \leq 0.05 \quad (3); \text{and}$$

$$|\beta-\gamma|/(\beta+\gamma) \leq 0.05 \quad (4).$$

11. The imaging method according to claim 1,
wherein a first wavelength, a second wavelength, and a third wavelength are selected in the wavelength selection step, reflectivity $\alpha$ of the first subject and reflectivity $\beta$ of the third subject at the first wavelength, the second wavelength, and the third wavelength satisfy a relationship of Expression (5), reflectivity $\gamma$ of the second subject and the reflectivity $\beta$ of the third subject at the first wavelength, the second wavelength, and the third wavelength satisfy a relationship of Expression (6), and $(\beta-\alpha)$ and $(\beta-\gamma)$ at the second wavelength are smaller than $(\beta-\alpha)$ and $(\beta-\gamma)$ at the first wavelength and the third wavelength, Expressions (5) and (6) being represented by:

$$|\beta-\alpha|/(\beta+\alpha) \leq 0.15 \quad (5); \text{and}$$

$$|\beta-\gamma|/(\beta+\gamma) \leq 0.15 \quad (6).$$

12. The imaging method according to claim 1,
wherein a first wavelength, a second wavelength, and a third wavelength are selected in the wavelength selection step, reflectivity $\alpha$ of the first subject and reflectivity $\beta$ of the third subject at the first wavelength, the second wavelength, and the third wavelength satisfy a relationship of Expression (7), reflectivity $\gamma$ of the second subject and the reflectivity $\beta$ of the third subject at the first wavelength, the second wavelength, and the third wavelength satisfy a relationship of Expression (8), and $(\beta-\alpha)$ and $(\beta-\gamma)$ at the second wavelength are smaller than $(\beta-\alpha)$ and $(\beta-\gamma)$ at the first wavelength and the third wavelength, Expressions (7) and (8) being represented by:

$$|\beta-\alpha|/(\beta+\alpha) \leq 0.05 \quad (7); \text{and}$$

$$|\beta-\gamma|/(\beta+\gamma) \leq 0.05 \quad (8).$$

13. The imaging method according to claim 1,
wherein the multispectral camera includes a memory that stores a plurality of substitutional subjects substitutable for the third subject and fourth spectral data of each of the plurality of substitutional subjects, and
the processor performs
a notification step of issuing a notification of one substitutional subject among the plurality of substitutional subjects, as a third subject to be recommended, based on the first spectral data, the second spectral data, and the fourth spectral data.

14. The imaging method according to claim 4,
wherein the processor performs a sensitivity correction step of correcting sensitivity of an imaging element of the multispectral camera based on the correction step.

15. The imaging method according to claim 1,
wherein a third subject variable display step of variably displaying the third subject is further performed.

16. The imaging method according to claim 1,
wherein an irradiation step for shadowless illumination is further performed.

17. A non-transitory, computer-readable tangible recording medium on which a program for causing, when read by a computer, the computer to execute the imaging method according to claim 1 is recorded.

* * * * *